(12) United States Patent
Maeda et al.

(10) Patent No.: US 12,434,688 B2
(45) Date of Patent: Oct. 7, 2025

(54) VEHICLE INTEGRATED CONTROL DEVICE AND VEHICLE INTEGRATED CONTROL METHOD

(71) Applicant: Hitachi Astemo, Ltd., Hitachinaka (JP)

(72) Inventors: Kenta Maeda, Tokyo (JP); Masaru Yamasaki, Tokyo (JP); Kentarou Ueno, Hitachinaka (JP); Shuji Ohshita, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 144 days.

(21) Appl. No.: 18/562,855

(22) PCT Filed: Apr. 26, 2022

(86) PCT No.: PCT/JP2022/018829
§ 371 (c)(1),
(2) Date: Nov. 21, 2023

(87) PCT Pub. No.: WO2022/255006
PCT Pub. Date: Dec. 8, 2022

(65) Prior Publication Data
US 2024/0367640 A1   Nov. 7, 2024

(30) Foreign Application Priority Data
May 31, 2021   (JP) ................ 2021-091001

(51) Int. Cl.
*B60W 30/00* (2006.01)
*B60W 30/02* (2012.01)
*B60W 40/08* (2012.01)

(52) U.S. Cl.
CPC .......... *B60W 30/025* (2013.01); *B60W 40/08* (2013.01); *B60W 2720/16* (2013.01); *B60W 2720/18* (2013.01)

(58) Field of Classification Search
CPC ............... B60W 40/08; B60W 30/025; B60W 30/18145; B60W 2720/16;
(Continued)

(56) References Cited

U.S. PATENT DOCUMENTS 5,322,320 A * 6/1994 Sahashi ................ B60G 17/018
  280/5.515
10,002,471 B2 * 6/2018 Blayvas ................ G06Q 10/04
(Continued)

FOREIGN PATENT DOCUMENTS

JP    2006-007803 A    1/2006
JP    2018-047760 A    3/2018

OTHER PUBLICATIONS

International Search Report of PCT/JP2022/018829 dated Jul. 26, 2022.

*Primary Examiner* — Phutthiwat Wongwian
*Assistant Examiner* — Sherman D Manley
(74) *Attorney, Agent, or Firm* — Mattingly & Malur, PC

(57) ABSTRACT

A vehicle integrated control device improves ride comfort and prevents the onset of motion sickness. The vehicle integrated control device acquires a target momentum of a control axis related to a driving task of the vehicle and generates a first motion parameter and a second motion parameter different from the first motion parameter that is based on the first motion parameter to optimize a sensitivity index. A limit generation unit generates a motion limit amount of the second motion parameter based on the first motion parameter and an operation range of an actuator, a final target generation unit that corrects the second motion parameter based on the motion limit amount, and an operation amount assignment unit that determines an operation amount of an actuator based on the first motion parameter and the second motion parameter corrected by the final target generation unit.

13 Claims, 13 Drawing Sheets

(a)

(b)

(58) Field of Classification Search
CPC ....... B60W 2720/18; B60W 2050/001; B60W 2050/0056; B60W 2520/105; B60W 2520/125; B60W 2540/10; B60W 2540/12; B60W 2540/18; B60W 10/184; B60W 10/22; B60W 10/20
See application file for complete search history.

(56) References Cited

U.S. PATENT DOCUMENTS

| | | | |
|---|---|---|---|
| 10,120,385 B2* | 11/2018 | Connor | B60W 50/14 |
| 2018/0348769 A1* | 12/2018 | Sato | B60W 30/02 |
| 2019/0168785 A1* | 6/2019 | Ogawa | F16F 9/461 |
| 2019/0310091 A1* | 10/2019 | Maeda | G01C 21/30 |
| 2019/0315342 A1* | 10/2019 | Bertollini | G05D 1/0088 |
| 2020/0122538 A1* | 4/2020 | Engelmann | B62D 55/065 |
| 2020/0341470 A1* | 10/2020 | Maeda | G01C 21/3822 |
| 2022/0097758 A1* | 3/2022 | Kasai | B62D 6/008 |
| 2023/0092834 A1* | 3/2023 | Fukukawa | B60W 30/18127 701/22 |
| 2023/0137911 A1* | 5/2023 | Nasu | B60W 40/072 701/23 |
| 2023/0398880 A1* | 12/2023 | Yamasaki | B60L 3/0061 |
| 2023/0415775 A1* | 12/2023 | Maeda | B60W 30/025 |
| 2024/0001910 A1* | 1/2024 | Yamasaki | B60W 10/08 |
| 2024/0034328 A1* | 2/2024 | Nasu | B60W 60/0013 |
| 2024/0246562 A1* | 7/2024 | Nasu | B60W 60/001 |
| 2024/0278772 A1* | 8/2024 | Yamasaki | B60W 30/045 |

* cited by examiner

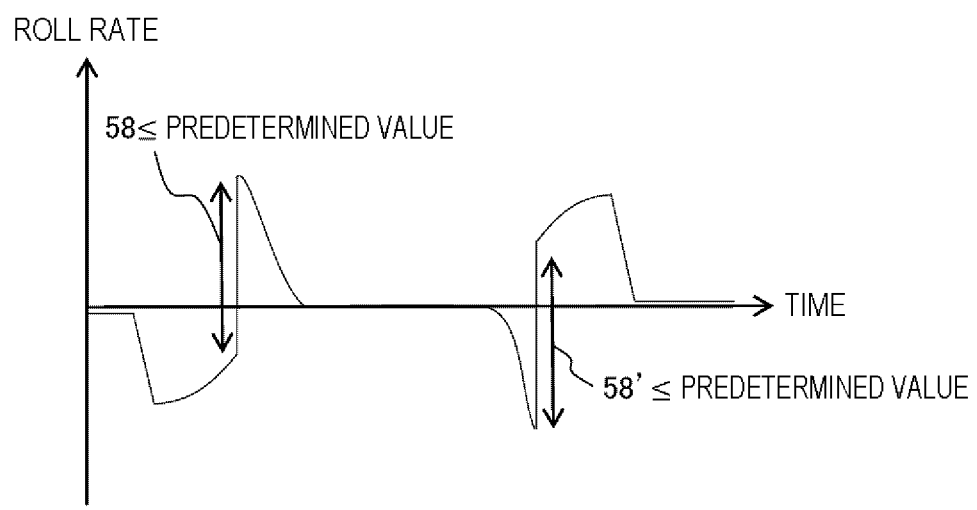

(a)

(b)

(c)

(a)

(b)

(c)

VEHICLE INTEGRATED CONTROL DEVICE AND VEHICLE INTEGRATED CONTROL METHOD

TECHNICAL FIELD

The present invention relates to a vehicle integrated control device and a vehicle integrated control method for controlling a posture of a vehicle to improve ride comfort of an occupant and prevent onset of motion sickness.

BACKGROUND ART

For example, JP 2018-47760 A (PTL 1) discloses a vehicle integrated control device that controls a posture of a vehicle.

PTL 1 describes that, in a vehicle posture control device (vehicle integrated control device) that controls a posture of a vehicle in which posture control devices of a number larger than the number of degrees of freedom of posture control are installed, a target value calculation unit calculates a target motion state quantity of the number of degrees of freedom based on a state of the vehicle, and a control force calculation unit calculates a control force vector so that a square norm of the control force vector for driving the posture control device is minimized and the target motion state quantity is realized (see the abstract of PTL 1).

Further, PTL 1 describes that the target value calculation unit outputs the calculated target up and down force Fz, target roll moment Mx, target pitch moment My, target yaw moment Mz, and target front and rear force Fx to the control force calculation unit (see PTL 0027).

CITATION LIST

Patent Literature

PTL 1: JP 2018-47760 A

SUMMARY OF INVENTION

Technical Problem

PTL 1 describes a vehicle integrated control device that controls the posture of a vehicle in which a larger number of posture control devices than the number of degrees of freedom of posture control are installed.

However, PTL 1 does not describe an operation range of a posture control device (actuator) when controlling a posture of a vehicle.

Therefore, in the vehicle integrated control device described in PTL 1, the target up and down force Fx, the target front and rear force Fz, the target roll moment Mx, the target pitch moment My, and the target yaw moment Mz, which are calculated by the target value calculation unit, may not be actually generated, and the posture of the vehicle resulting from the actuator limit may impair the ride comfort of the occupant, leading to the onset of motion sickness.

Therefore, the present invention provides a vehicle integrated control device and a vehicle integrated control method that appropriately correct a target value based on an actuator limit in an environment where the actuator limit exists, improve the ride comfort of an occupant, prevent the onset of motion sickness, integrally control the actuator, and control the posture of the vehicle.

Solution to Problem

In order to solve the above problems, a vehicle integrated control device and a vehicle integrated control method of the present invention control a motion parameter of a vehicle in which a plurality of actuators are installed, which are configured by a direction of movement on up to three control axes and the direction of rotation around the control axes.

A vehicle integrated control device of the present invention includes a first target value generation unit that acquires a target momentum of a control axis related to a driving task of the vehicle and generates a first motion parameter that is at least one motion parameter, a second target value generation unit that generates a second motion parameter different from the first motion parameter based on the first motion parameter to optimize a sensitivity index, a limit generation unit that generates a motion limit amount of the second motion parameter based on the first motion parameter and an operation range of an actuator, a final target generation unit that corrects the second motion parameter based on the motion limit amount, and an operation amount assignment unit that generates an operation amount of an actuator based on the first motion parameter and the second motion parameter corrected by the final target generation unit.

A vehicle integrated control method of the present invention includes acquiring a target momentum of a control axis related to a driving task of the vehicle and generating a first motion parameter that is at least one motion parameter by a first target value generation unit, generating a second motion parameter different from the first motion parameter based on the first motion parameter to optimize a sensitivity index by a second target value generation unit, generating a motion limit amount of the second motion parameter based on the first motion parameter and an operation range of an actuator by a limit generation unit, correcting the second motion parameter based on the motion limit amount by a final target generation unit, and generating an operation amount of an actuator based on the first motion parameter and the second motion parameter corrected by the final target generation unit by an operation amount assignment unit.

Advantageous Effects of Invention

According to the present invention, it is possible to provide a vehicle integrated control device and a vehicle integrated control method that appropriately correct a target value based on an actuator limit in an environment where the actuator limit exists, improve the ride comfort of an occupant, prevent the onset of motion sickness, integrally control the actuator, and control the posture of the vehicle.

Problems, configurations, and effects other than those described above will be clarified by the following description of embodiments.

BRIEF DESCRIPTION OF DRAWINGS

FIG. 12B is an explanatory diagram for illustrating a time waveform of roll rate control by the vehicle integrated control device 2 described in Example 1.

DESCRIPTION OF EMBODIMENTS

Figure 1:
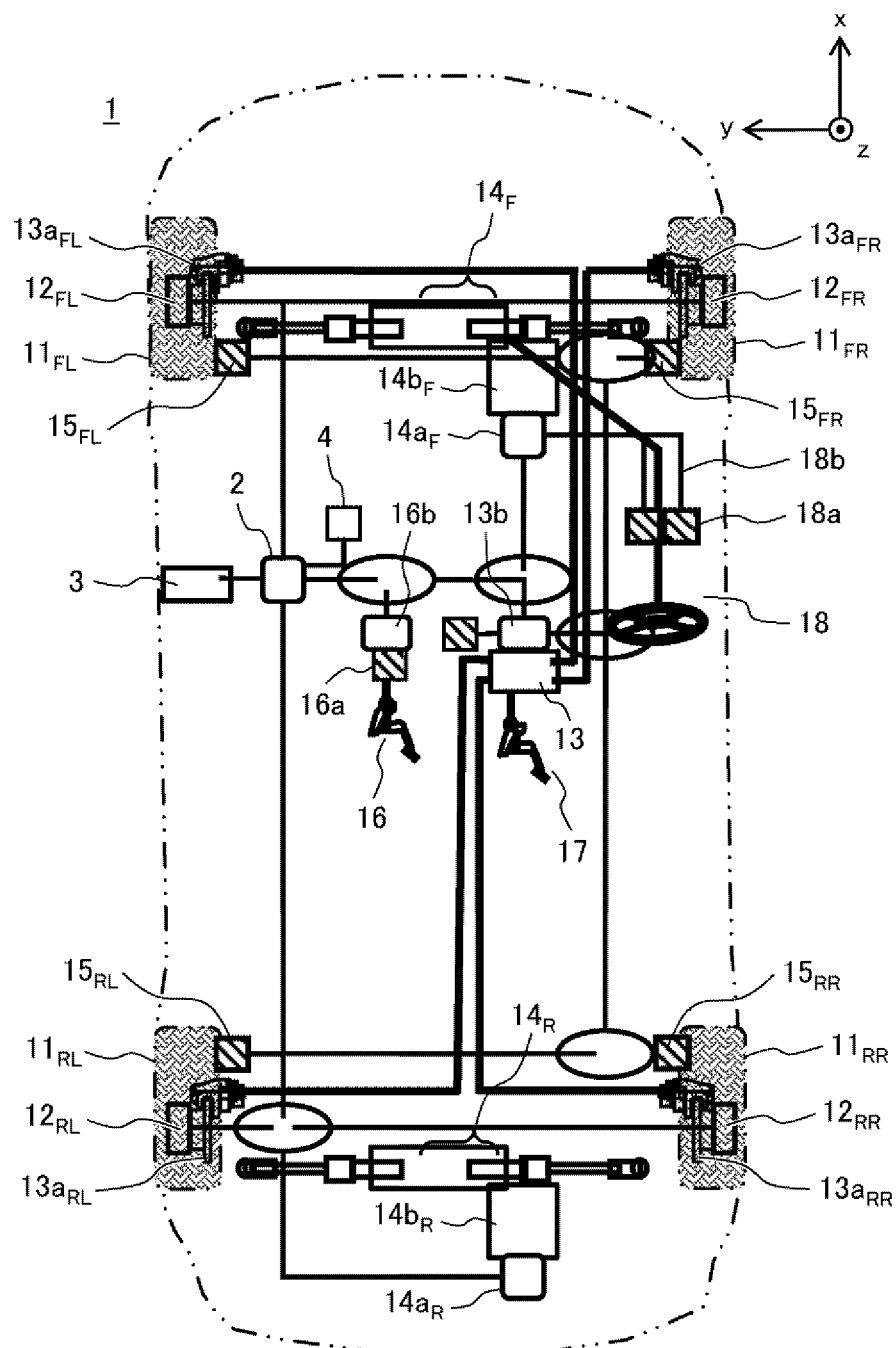
FIG. 1 is a plan view for illustrating an overall configuration of a vehicle 1 described in Example 1.

Hereinafter, embodiments of the present invention will be described with reference to the drawings. Note that, in the drawings, substantially the same or similar configurations will be denoted by the same reference numerals, and the configurations will be described. In a case where the description overlaps, the overlapping description may be omitted.

Example 1

First, an overall configuration of a vehicle 1 described in Example 1 will be described.

FIG. 1 is a plan view for illustrating an overall configuration of the vehicle 1 described in Example 1.

The vehicle 1 includes a vehicle integrated control device 2, an external control device 3, a combined sensor 4, wheels 11, a motor 12, a brake mechanism 13, a steering mechanism 14, a suspension 15, an accelerator pedal 16, a brake pedal 17, and a steering wheel 18.

In FIG. 1, FL, FR, RL, and RR attached to reference numerals denote left front, right front, left rear, and right rear, respectively. For example, among the wheels 11, $11_{FL}$, $11_{FR}$, $11_{RL}$, and $11_{RR}$ denote a left front wheel, a right front wheel, a left rear wheel, and a right rear wheel, respectively. Further, in FIG. 1, F attached to a reference numeral is a reference numeral indicating a configuration corresponding to the front side, and R is a reference numeral corresponding to the rear side, and for example, $14_F$ and $14_R$ indicate a front steering mechanism and a rear steering mechanism, respectively.

Hereinafter, the front and rear direction of the vehicle 1 is defined as an x-axis (the front direction is positive), the left and right direction as a y-axis (the left direction is positive), and the up and down direction as a z-axis (the upper direction is positive), and each configuration will be described.

The vehicle integrated control device 2 is a control device that integrally controls each actuator such as the motor 12, the brake mechanism 13, the steering mechanism 14, and the suspension 15 according to an operation (operation command) of a driver, an external command from the external control device 3, and a detection signal (detection signal related to control axes of a total of six degrees of freedom of each acceleration of front and rear, right and left, and up and down, and each rate of roll, pitch, and yaw) of the combined sensor 4.

Specifically, the vehicle integrated control device 2 is an electronic control unit (ECU) having hardware such as an arithmetic device such as a CPU, a main storage device such as a semiconductor memory, an auxiliary storage device, and a communication device.

Further, in the vehicle integrated control device 2, the arithmetic device executes the program loaded from the auxiliary storage device to the main storage device, thereby realizing each function that will be described later. Such well-known techniques will be appropriately omitted below.

The external control device 3 is a host controller that executes driving support control and automatic driving control vehicle integrated control device 2, calculates a speed command value and an acceleration command value for realizing adaptive cruise control (ACC) for following a preceding vehicle, a yaw command value for realizing lane keep control (LKC) for maintaining travel in a lane, and the like based on external information acquired by various external sensors (a camera, radar, LiDAR, etc.) that are not illustrated, and outputs the calculated values to the vehicle integrated control device 2 as external commands.

Although the vehicle integrated control device 2 and the external control device 3 are illustrated as separate bodies in FIG. 1, the vehicle integrated control device 2 and the external control device 3 may be realized by one ECU.

<<Drive System of Vehicle 1>>

Here, a drive system of the vehicle 1 will be described.

The vehicle 1 is equipped with a torque generation device that applies a driving force to each wheel 11 as a main part of a drive system. One example of the torque generation device is an engine or a motor that transmits driving force to a pair of left and right wheels 11 via a differential gear and a drive shaft.

Another example of the torque generation device is an in-wheel motor type motor 12 that independently drives each wheel 11. Hereinafter, an example will be described on the premise of the vehicle 1 illustrated in FIG. 1 in which the in-wheel motor type motor 12 is mounted in each wheel 11.

In a case where the driver desires to move the vehicle 1 forward (alternatively, backward), the driver sets the shift lever to a desired setting and then operates the accelerator pedal 16. At this time, the stroke sensor 16a detects the depression amount of the accelerator pedal 16, and the acceleration control device 16b outputs an accelerator command obtained by converting the depression amount to the vehicle integrated control device 2.

The vehicle integrated control device 2 supplies electric power corresponding to the input accelerator command from a battery (not illustrated) to the motor 12 of each wheel, and controls each motor torque. As a result, the vehicle 1 can be accelerated and decelerated in accordance with the operation of the accelerator pedal 16.

In a case of driving assistance or automatic driving is performed according to an external command from the external control device 3, the vehicle integrated control device 2 supplies desired electric power to the motor 12 of each wheel according to the input external command, thereby controlling each motor torque. As a result, the vehicle 1 is accelerated and decelerated, and desired driving support and automatic driving are executed.

<<Braking System of Vehicle 1>>

Next, a braking system of the vehicle 1 will be described.

The vehicle 1 is equipped with a wheel cylinder 13a that applies a braking force to each wheel 11 as a main part of a braking system. The wheel cylinder 13a includes, for example, a cylinder, a piston, a pad, a disk rotor, and the like.

In the wheel cylinder 13a, the piston is propelled by the hydraulic fluid supplied from the master cylinder, and the pad connected to the piston is pressed by the disk rotor rotating together with the wheel 11, whereby the brake torque acting on the disk rotor becomes the braking force acting between the wheel 11 and the road surface.

In a case where the driver wants to brake the vehicle 1, the driver operates the brake pedal 17. At this time, the stepping force of the driver stepping on the brake pedal 17 is increased by a brake booster (not illustrated), and the master cylinder generates a hydraulic pressure substantially proportional to the stepping force.

The generated hydraulic pressure is supplied to the wheel cylinders $13a_{FL}$, $13a_{FR}$, $13a_{RL}$, and $13a_{RR}$ of the wheels via the brake mechanism 13. Therefore, the piston of the wheel cylinder 13a of each wheel is pressed against the disk rotor in response to the brake pedal operation by the driver, and the braking force is generated in each wheel.

In the vehicle 1 on which the vehicle integrated control device 2 is mounted, the brake booster and the master cylinder may be omitted. In this case, the brake pedal 17 and the brake mechanism 13 are directly connected, and when the driver steps on the brake pedal 17, the brake mechanism 13 directly operates.

In addition, in a case where driving assistance or automatic driving is performed in response to an external command from the external control device 3, the vehicle integrated control device 2 controls the brake mechanism 13 and the wheel cylinder 13a of each wheel via a brake control device 13b in response to the input external command. As a result, the vehicle 1 is braked, and desired driving support and automatic driving are executed. The brake control device 13b also has a function of converting an operation amount of the brake pedal 17 by the driver into a brake command and outputting the brake command as an external command to the vehicle integrated control device 2.

<<Steering System of Vehicle 1>>

Next, a steering system of the vehicle 1 will be described.

The vehicle 1 is equipped with a steering mechanism 14 that applies a steering force to each wheel 11 as a main part of a steering system. In FIG. 1, the steering mechanism $14_F$ on the front side for steering the front wheels 11F (the left front wheel $11_{FL}$ and the right front wheel $11_{FR}$) and the steering mechanism $14_R$ on the rear side for steering the rear wheels 11R (the left rear wheel $11_{RL}$ and the right rear wheel $11_{RR}$) are illustrated, but it is not necessary to have the steering mechanism 14 on the front and rear sides, and for example, the steering mechanism $14_R$ on the rear side may be omitted.

In a case where the driver desires to steer the vehicle 1, the driver operates the steering wheel 18. At this time, the "steering torque" and the "steering angle" input by the driver via the steering wheel 18 are detected by a steering torque detection device 18a and a steering angle detection device 18b.

The front steering control device $14a_F$ controls the front steering motor $14b_F$ based on the detected steering torque and steering angle to generate assist torque for steering the front wheels 11r. Similarly, the rear steering control device $14a_R$ controls the rear steering motor $14b_R$ based on the detected steering torque and steering angle to generate assist torque for steering the rear wheels 11R.

In addition, in a case of driving assistance or automatic driving is performed according to an external command from the external control device 3, the vehicle integrated control device 2 controls the steering torque of a steering motor 14b via a steering control device 14a. As a result, the vehicle 1 is braked, and desired driving support and automatic driving are executed. In this case, the steering wheel 18 may be omitted.

<<Suspension System of Vehicle 1>>

Next, a suspension system of the vehicle 1 will be described.

As a main part of the suspension system, the vehicle 1 is mounted with the suspension 15 for absorbing vibration and impact generated in each wheel 11 and improving stability, ride comfort, and the like of the vehicle body. The suspension 15 is, for example, a semi-active suspension in which a damper capable of changing viscosity and a coil spring are combined, or a full active suspension in which an adjustment actuator capable of adjusting a length, a damper, and a coil spring are combined, and a relative distance between the vehicle body and the wheel 11 can be arbitrarily changed.

The vehicle integrated control device 2 not only improves the stability of the vehicle body, the ride comfort, and the like by controlling the viscosity of the semi-active suspension and the length of the full active suspension, but also appropriately controls the posture of the vehicle 1 according to the environment.

Next, an input and output signals of the vehicle integrated control device 2 described in Example 1 will be described.

Figure 2:
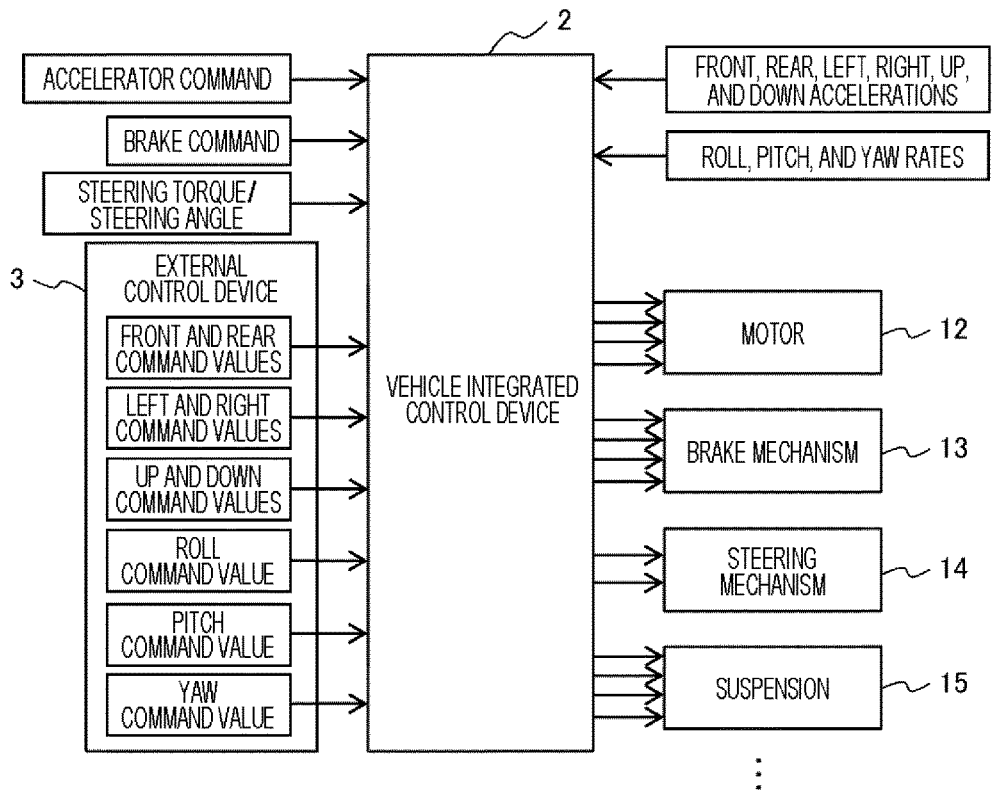
FIG. 2 is a schematic diagram for illustrating input and output signals of a vehicle integrated control device 2 described in Example 1.

FIG. 2 is a schematic diagram for illustrating input and output signals of a vehicle integrated control device 2 described in Example 1.

The vehicle integrated control device 2 receives, as an external command, an accelerator command, a brake command, a steering torque, a steering angle, and the like generated when the driver operates the accelerator pedal 16, the brake pedal 17, the steering wheel 18, and the like.

Further, the vehicle integrated control device 2 receives external commands having a total of six degrees of freedom, which are a front and rear command value, a left and right command value, an up and down command value, a roll command value, a pitch command value, and a yaw command value, generated by the external control device 3 during driving assistance control or automatic driving control.

Further, each of the detection values (detection signals) of front and rear, left and right, up and down accelerations and each of rates of roll, pitch, and yaw are input from the combined sensor 4 to the vehicle integrated control device 2.

Then, the vehicle integrated control device 2 appropriately distributes the operation amount of each of the motor 12 ($12_{FL}$ to $12_{RR}$), the brake mechanism 13 (wheel cylinders $13a_{FL}$ to $13a_{RR}$), the steering mechanism 14 (steering motors $14b_F$ and $14b_R$), and the suspension 15 ($15_{FL}$ to $15_{RR}$) based on the external command and the detection value (detection signal), executes each control of driving, braking, steering, and suspension, and realizes desired vehicle control including posture control.

Hereinafter, the motor 12, the brake mechanism 13, the steering mechanism 14, and the suspension 15 may be collectively referred to as an "actuator".

Note that the vehicle 1 illustrated in FIG. 1 corresponds to manual driving, and thus, FIG. 2 also illustrates an external command derived from the driver. However, Example 1 can also be applied to the vehicle 1 corresponding only to fully automatic driving or remote operation driving. In this case, the external command derived from the driver may be omitted.

Next, functional blocks of the vehicle integrated control device 2 described in Example 1 will be described.

Figure 3:
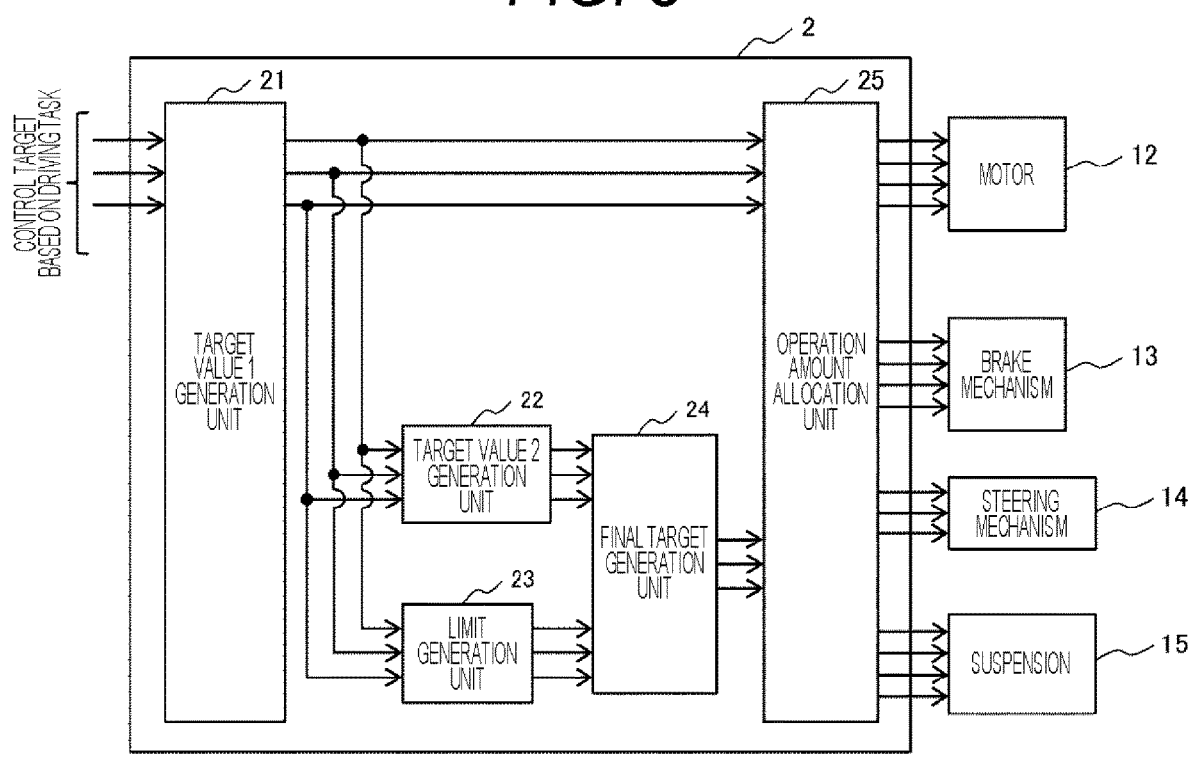
FIG. 3 is an explanatory diagram for illustrating functional blocks of the vehicle integrated control device 2 described in Example 1.

FIG. 3 is an explanatory diagram for illustrating functional blocks of the vehicle integrated control device 2 described in Example 1.

Although FIG. 2 illustrates the vehicle integrated control device 2 to which three types of external commands caused by the driver are input and six types of external commands from the external control device 3 are input, there is a possibility that any external command is not input depending on the specifications of the external control device 3.

Therefore, FIG. 3 illustrates a situation in which any external command among external commands from the external control device 3 that can be input is missing, and the vehicle integrated control device 2 according to Example 1 will be described.

Note that, hereinafter, arbitrary three types of command values among the six types of external commands (front and rear command value, left and right command value, up and down command value, roll command value, pitch command value, and yaw command value) that can be input from the external control device 3 are referred to as a first command value, a second command value, and a third command value.

The vehicle integrated control device 2 described in Example 1 generates an internal command that substitutes the external command that has not been input so that posture control that does not impair the operation feeling of the driver and the ride comfort of the occupant can be realized within the range of the actuator limit that is the limit of the operation amount of each actuator such as the motor 12, the brake mechanism 13, the steering mechanism 14, and the suspension 15 even in a case where the type of the input external command is insufficient, and appropriately distributes the operation amount of the motor 12, the brake mechanism 13, the steering mechanism 14, the suspension 15, and the like in consideration of the internal command.

In order to realize such control, the vehicle integrated control device 2 includes a target value 1 generation unit 21, a target value 2 generation unit 22, a limit generation unit 23, a final target generation unit 24, and an operation amount assignment unit 25.

The target value 1 generation unit 21 acquires an external command (control target based on the operation task) from the external control device 3, generates a target value 1, and outputs the target value 1 to the target value 2 generation unit 22, the limit generation unit 23, and the operation amount assignment unit 25.

In a case where three types of external commands (accelerator command, brake command, steering torque, and steering angle) caused by the driver are input, the target value 1 generation unit 21 converts the external commands into a front and rear command value, a left and right command value, and a yaw command value of the same type as the external commands from the external control device 3, and outputs the converted values as the target value 1.

Based on the input type of target value 1, the target value 2 generation unit 22 generates a target value 2 that is an internal command of the same type as the type of the external command that has not been input or that can be used as a substitute, and outputs the generated target value 2 to the final target generation unit 24.

Here, the target value 2 generation unit 22 plays a role of generating a target value of the vehicle movement in consideration of the ride comfort of the occupant, and generates a target value 2 that optimizes a sensitivity index (for example, in order to minimize the motion sickness incidence) for evaluating the ride comfort of the occupant.

In addition, based on the target value 1, the target value 2 generation unit 22 generates the target value 2 to reduce the inertia acceleration (the inertia acceleration in the front and rear direction and/or the left and right direction) generated by the occupant.

The limit generation unit 23 generates a limit value of the target value 2 generated by the target value 2 generation unit 22 based on the input type of target value 1 and the operation range (actuator limit) of each actuator mounted on the vehicle 1, and outputs the limit value to the final target generation unit 24.

For example, in a case where the target value 1 generation unit 21 generates the front and rear acceleration, the left and right acceleration, and the yaw rate as the target value 1, there is a high possibility that the remaining up and down acceleration, the roll angle, and the pitch angle are generated as the target value 2 in the target value 2 generation unit 22. At this time, the limit generation unit 23 generates an operation range (actuator limit) of each actuator generated based on the target value 1 for at least one of the up and down acceleration, the roll angle, and the pitch angle.

In addition, the limit generation unit 23 generates an upper limit or a lower limit of the roll angle or the pitch angle as a limit value of the target value 2.

The final target generation unit 24 corrects the target value 2 based on the target value 2 output from the target value 2 generation unit 22 and the actuator limit generated by the limit generation unit 23, generates a final target value that is a final target value of the vehicle movement, and outputs the final target value to the operation amount assignment unit 25.

The operation amount assignment unit 25 appropriately controls the distribution of the operation amount of the motor 12, the brake mechanism 13, the steering mechanism 14, the suspension 15, and the like based on the input type of target value 1 (external command acquired from the external control device 3) and the final target value generated by the final target generation unit 24 (target value 2 corrected by the final target generation unit 24).

As a result, it is possible to realize posture control (actuator control) that improves the operation feeling of the driver and the ride comfort of the occupant also with respect to the vehicle movement corresponding to the type of external command not input from the external control device 3.

As described above, in the vehicle integrated control device 2 and the vehicle integrated control method described in Example 1, the posture of the vehicle 1 in which the plurality of actuators are installed is controlled by the movement directions (front and rear, left and right, and up and down) on the maximum of three control axes and the rotation direction (roll, pitch, and yaw) about the control axes, and the target value of the vehicle movement is generated (determined) in consideration of the operation range of the actuators.

Then, the vehicle integrated control device 2 includes a target value 1 generation unit (first target value generation unit) 21 that acquires a target momentum (external command) of a control axis related to a driving task (vehicle movement) of the vehicle 1 and generates a first motion parameter (target value 1) that is at least one motion parameter; a target value 2 generation unit (second target value generation unit) 22 that generates, based on the first motion parameter, a second motion parameter (target value 2) different from the first motion parameter to optimize a sensitivity index; a limit generation unit 23 that generates a motion limit amount (a limit value of the target value 2) of the second motion parameter based on the first motion parameter and an operation range of the actuator; and a final target generation unit 24 that corrects the second motion parameter based on the motion limit amount, an operation amount assignment unit 25 that generates an operation amount of the actuator based on the first motion parameter and the second motion parameter corrected by the final target generation unit 24.

The vehicle integrated control method includes the steps of: acquiring a target momentum (external command) of a control axis related to a driving task (vehicle movement) of the vehicle 1 in a target value 1 generation unit (first target value generation unit) 21, and generating a first motion parameter (target value 1) which is at least one motion parameter; generating a second motion parameter (target value 2) different from the first motion parameter based on the first motion parameter to optimize a sensitivity index in a target value 2 generation unit (second target value generation unit) 22; generating a motion limit amount (limit value of target value 2) of the second motion parameter based on the first motion parameter and an operation range of an actuator in a limit generation unit 23, correcting the second motion parameter based on the motion limit amount in a final target generation unit 24, and generating the operation amount of the actuator based on the first motion parameter and the second motion parameter corrected by the final target generation unit 24 in the operation amount assignment unit 25.

As described above, according to the vehicle integrated control device 2 and the vehicle integrated control method described in Example 1, even in an environment where the actuator limit exists, the actuator can be integrally controlled to appropriately correct the target value of the vehicle movement based on the actuator limit, improve the ride comfort of the occupant, and prevent the onset of the motion sickness (optimize the sensitivity index).

Next, a method of calculating the motion sickness incidence will be described.

Figure 4:
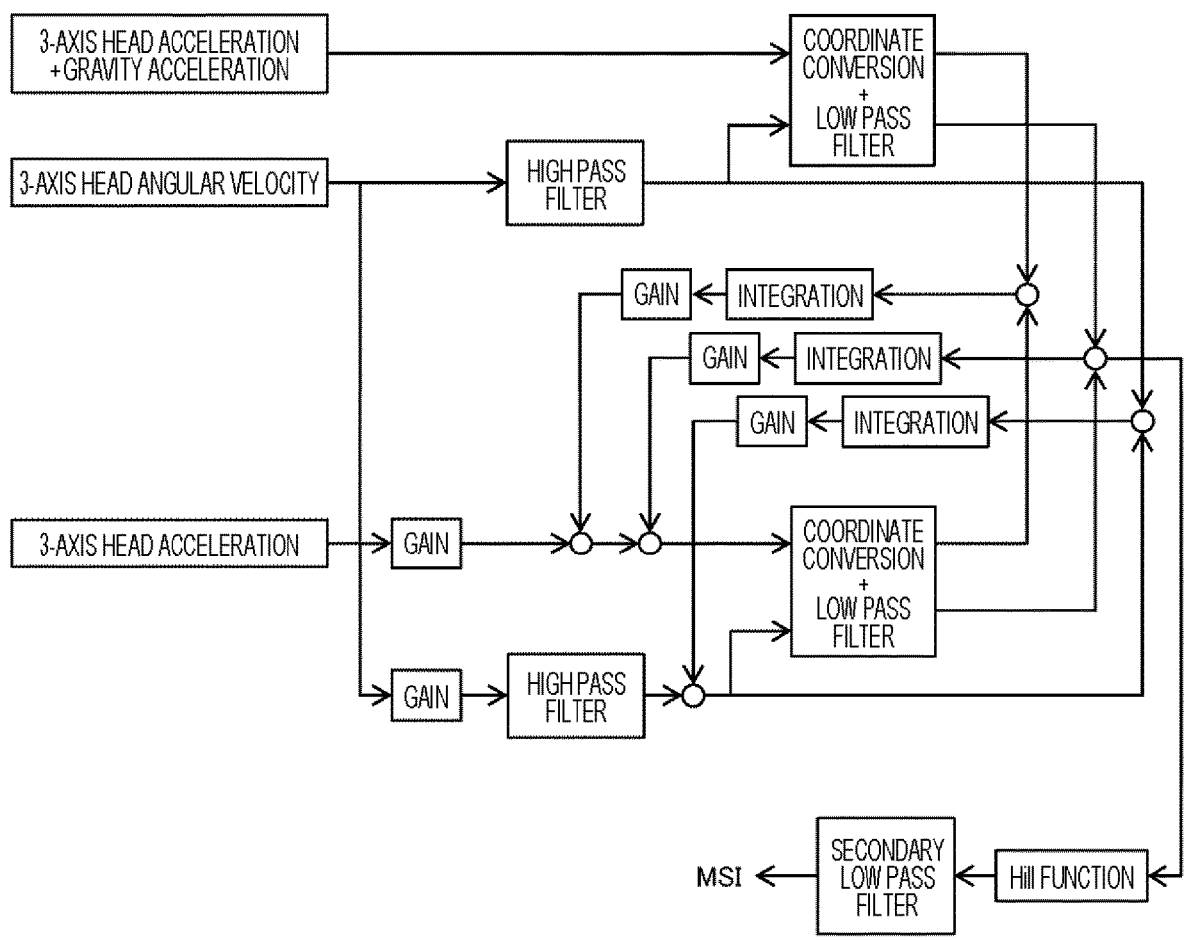
FIG. 4 is an explanatory diagram for illustrating a calculation method of motion sickness incidence.

FIG. 4 is an explanatory diagram for illustrating a calculation method of motion sickness incidence.

Here, as an example of the sensitivity index for evaluating the ride comfort of the occupant, the motion sickness incidence (MSI), which is the onset rate of motion sickness (so-called "carsickness"), will be described.

The motion sickness incidence (MSI) can be calculated by, for example, a calculation method as illustrated in FIG. 4. That is, the MSI can be calculated based on a 3-axis head acceleration+a gravity acceleration, a 3-axis head angular velocity, and a 3-axis head acceleration. Note that "head acceleration" and "head angular velocity" in FIG. 4 are acceleration and angular velocity received by the head of the occupant during driving of the vehicle 1.

Since the smaller the MSI is, the less likely the occupant will develop motion sickness and the more comfortable the ride is, the target value 2 generation unit 22 generates an internal command that reduces the MSI.

Note that the target value 2 generation unit 22 has learned the correspondence relationship between the sensitivity index and the internal command, and can generate the internal command (target value 2) for improving the MSI without measuring the head acceleration and the head angular velocity of the occupant in real time.

Another example of the sensitivity index is a motion sickness dose value (MSDV). This is a value obtained by extracting a specific frequency component that is particularly likely to cause the motion sickness among accelerations generated in the human body, and the higher this value is, the more likely to cause motion sickness. Therefore, in a case of focusing on this sensitivity index, the target value 2 generation unit 22 generates an internal command for controlling the front and rear, left and right, and up and down accelerations not to generate the specific frequency component.

Another example of the sensitivity index is a time constant for a steering angle. This is obtained by defining the response time (delay time) of each rate of the left and right acceleration, the roll, and the yaw as a time constant with respect to the change in the steering angle, and when the difference in the time constant regarding the three momenta (left and right acceleration, roll, and yaw) is small (the three momenta have similar values), it is easy to drive, and as a result, a comfortable car for the occupant is obtained. Therefore, in a case of focusing on this sensitivity index, the target value 2 generation unit 22 uses this "difference in time constant" as an index and generates an internal command for controlling the left and right acceleration, roll, and yaw to reduce this index.

In addition, another example of the sensitivity index is a biometric signal (for example, sweating and heart rate). In a case where the driver develops the motion sickness, an increase in heart rate and sweating of the palm and forehead are observed. Therefore, in a case of focusing on this sensitivity index, the target value 2 generation unit 22 generates an internal command for controlling the momentum of the six axes so that this biometric signal is improved.

Next, a mechanism leading to the onset of motion sickness and a mechanism for preventing the onset of motion sickness will be described.

Figure 5:
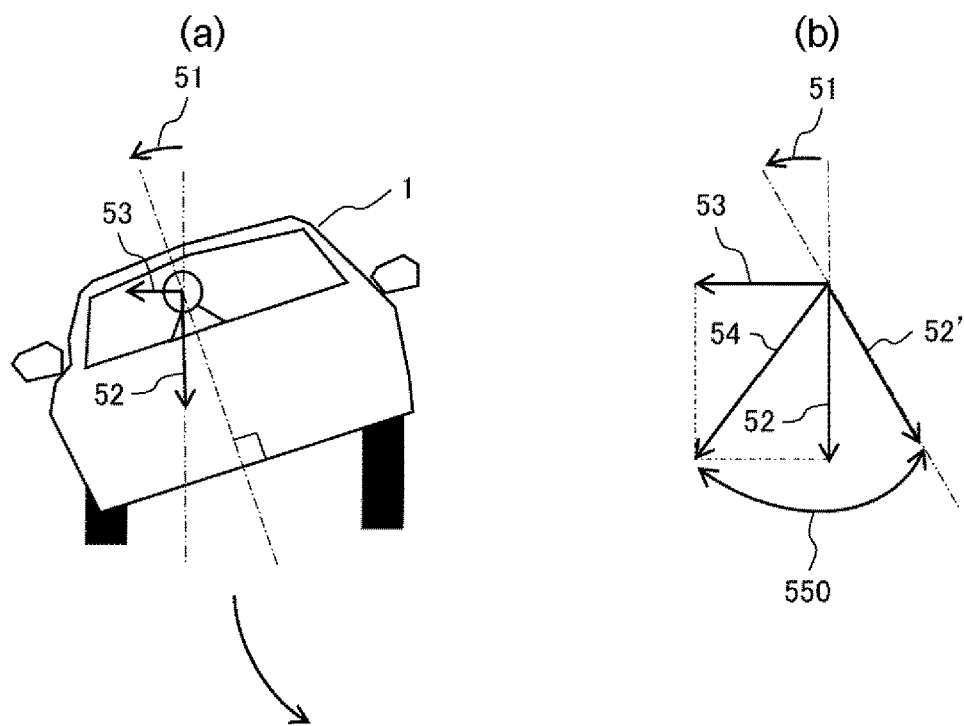
FIG. 5 is an explanatory diagram for illustrating a mechanism leading to onset of motion sickness.
Figure 6:
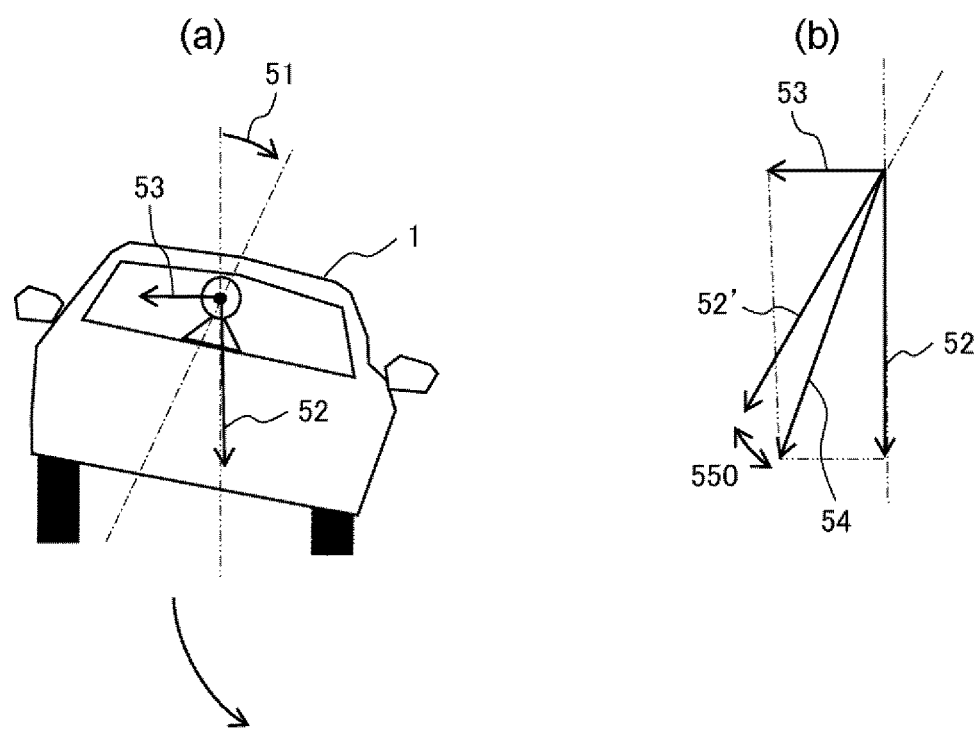
FIG. 6 is an explanatory diagram for illustrating a mechanism for preventing the onset of motion sickness.

FIG. 5 is an explanatory diagram for illustrating a mechanism leading to the onset of the motion sickness, and FIG. 6 is an explanatory diagram for illustrating a mechanism for preventing the onset of motion sickness.

A relationship between an inertia acceleration 53 generated in the vehicle 1 and the MSI will be described with reference to FIGS. 5 and 6.

The left part (a) of FIG. 5 illustrates a state in which the vehicle 1 travels toward the front and turns to the right in the traveling direction. At this time, with respect to the vehicle 1, the inertia acceleration 53 is generated on the outer side of the turning (the left side direction on the paper surface). In the conventional vehicle 1 (in which the present invention is not used), the roll angle 51 occurs in the turning outer direction at the time of turning. At the same time, the gravity acceleration 52 and the inertia acceleration 53 are constantly generated in the head of the occupant riding the vehicle in the vertically downward direction and the turning outer direction with respect to the ground, respectively.

In the right part (b) of FIG. 5, the inertia acceleration 53 generated on the head of the occupant is extracted and drawn. At this time, due to the roll angle 51, the gravity acceleration 52' expected by the occupant is in the downward direction with respect to the vehicle 1 (the downward rightward direction on the paper surface). On the other hand, on the head of the occupant, a combined acceleration 54 (downward leftward direction on the paper surface) of the original gravity acceleration 52 and the inertia acceleration 53 generated by turning is generated. The MSI is calculated by calculating the gravity acceleration 52' expected by the occupant and the combined acceleration 54 (an angle formed by a vector of the gravity acceleration 52' expected by the occupant and a vector of the combined acceleration 54).

The left part (a) of FIG. 6 illustrates a state in which the vehicle 1 travels toward the front and turns to the right in the traveling direction as in FIG. 5. In particular, with respect to the vehicle 1, the inertia acceleration 53 is generated on the outer side of the turning (the left side direction on the paper surface). In the vehicle 1 in which the present invention is used, the roll angle 51 occurs in the turning inner direction at the time of turning. At the same time, the gravity acceleration 52 and the inertia acceleration 53 are constantly generated in the head of the occupant riding the vehicle in the vertically downward direction and the turning outer direction with respect to the ground, respectively.

In the right part (b) of FIG. 6, the inertia acceleration 53 generated on the head of the occupant is extracted and drawn as in FIG. 5. At this time, due to the roll angle 51, the gravity acceleration 52' expected by the occupant is in the downward direction with respect to the vehicle 1 (the downward leftward direction on the paper surface). On the other hand, on the head of the occupant, a combined acceleration 54 (downward leftward direction on the paper surface) of the original gravity acceleration 52 and the inertia acceleration 53 generated by turning is generated. The MSI is calculated by a deviation 550 between the gravity acceleration 52' expected by the occupant and the combined acceleration 54.

As the deviation 550 between the gravity acceleration 52' and the combined acceleration 54 expected by the occupant is larger, the occupant is more likely to develop the motion sickness. Comparing the case of FIG. 5 with the case of FIG. 6, the roll angle 51 occurs in the turning outer direction in the case of FIG. 5, but the roll angle 51 occurs in the turning inner direction in the case of FIG. 6.

As a result, in the case of FIG. 6, the deviation 550 between the gravity acceleration 52' expected by the occupant and the combined acceleration 54 is smaller than that in the case of FIG. 5. That is, compared to the case of FIG. 5, in the case of FIG. 6, the onset of the motion sickness of the driver is reduced. The present invention uses such a principle, and as illustrated in FIG. 6, by controlling the posture of the vehicle, the deviation 550 is reduced, and the onset of the motion sickness of the occupant is reduced.

That is, the target value 2 generation unit 22 controls the roll angle such that the combined acceleration 54 of the inertia acceleration 53 and the gravity acceleration 52 generated in the left and right direction is in the vertically downward direction with respect to the vehicle 1, and the deviation 550 between the combined acceleration 54 and the gravity acceleration 52' expected by the occupant is reduced, whereby the MSI is minimized.

In this manner, when the direction of the gravity acceleration 52' expected by the occupant matches the direction of the combined acceleration 54, the MSI is most reduced. In a case where the roll angle 51 is θ, the gravity acceleration 52 is G, and the lateral inertia acceleration 53 generated by turning is Ay, then θ is expressed by Expression 1.

$$\theta = \arctan(Ay/G) \qquad \text{[Math. 1]}$$

Here, a case where the inertia acceleration 53: Ay is generated in the left direction with respect to the traveling direction of the vehicle 1, that is, a case where the vehicle 1 turns in the right direction is defined as positive, and the roll angle 51 calculated at this time is also positive (counterclockwise with respect to the traveling direction), that is, a roll in the turning inner side (right side) direction.

Next, the vehicle 1 entering the left curve in Example 1 will be described.

Figure 7:
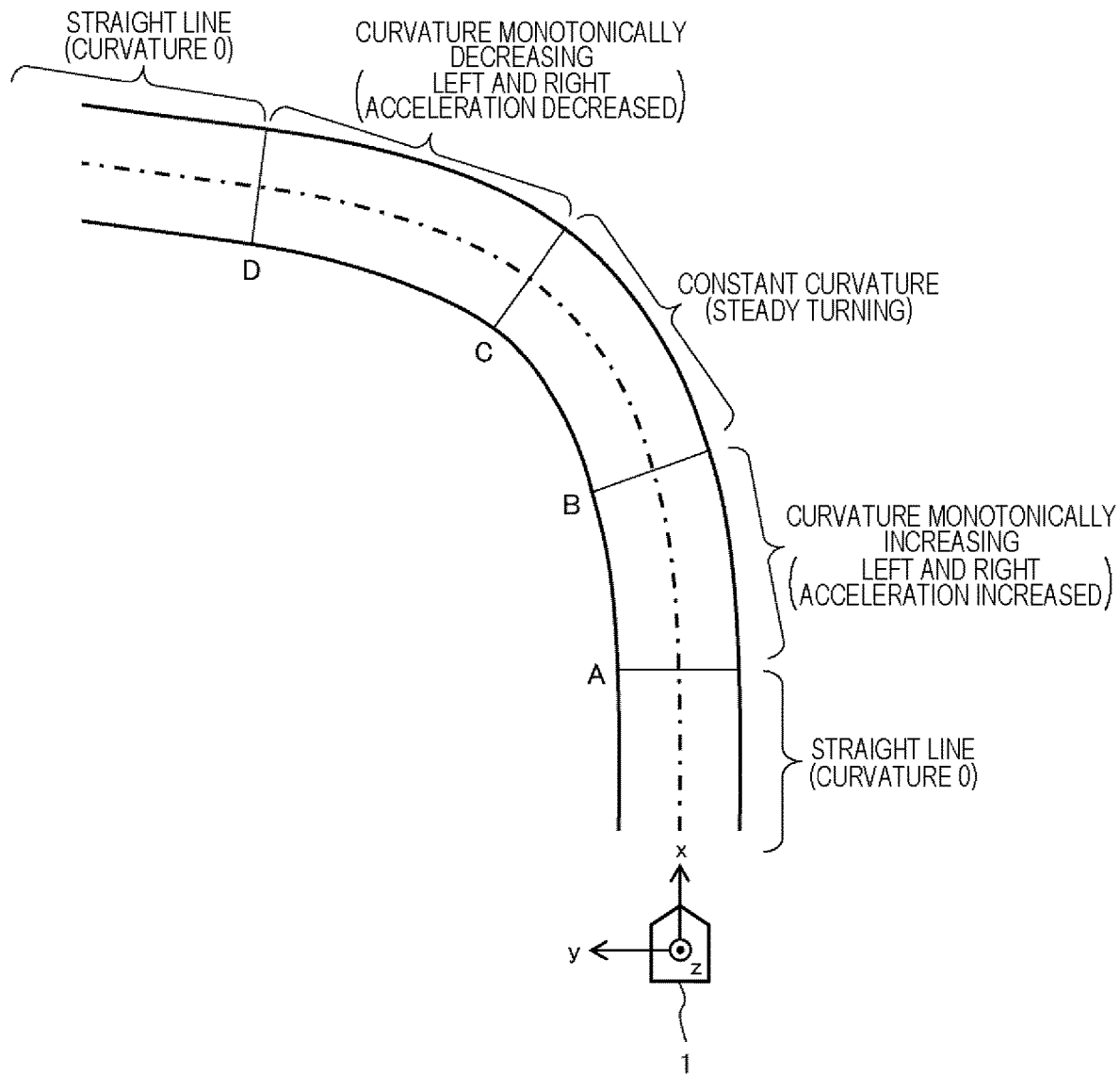
FIG. 7 is a plan view for illustrating a vehicle 1 entering a left curve in Example 1.

FIG. 7 is a plan view for illustrating the vehicle 1 entering the left curve in Example 1.

The road shape described here is a left curve, and the vehicle 1 enters the road having this left curve shape. The driving operation executed here is a left turn.

The road shown here is divided into a first section (to A) having a curvature of 0 (straight line), a second section (A to B) in which the curvature gradually increases (curvature monotonic increase: left and right acceleration increase), a third section (B to C) in which the curvature is constant (steady turning), a fourth section (C to D) in which the curvature gradually decreases (curvature monotonic decrease: left and right acceleration decrease), and a fifth section (D to) in which the curvature 0 (straight line).

Next, the behavior of the roll angle based on the actuator limit of the vehicle 1 will be described.

Figure 8:
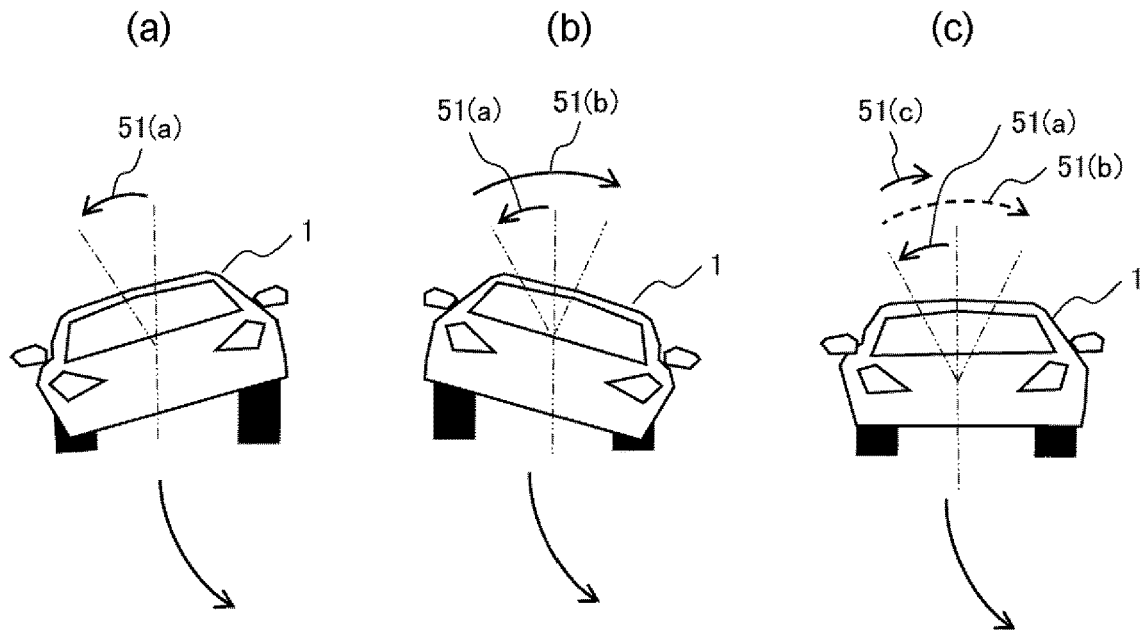
FIG. 8 is an explanatory diagram for illustrating a behavior of a roll angle based on an actuator limit of the vehicle 1.

FIG. 8 is an explanatory diagram for illustrating the behavior of the roll angle based on the actuator limit of the vehicle 1, and illustrates the actuator limit at the roll angle 51 that occurs in the third section illustrated in FIG. 7.

The vehicle 1 illustrated in FIG. 8 travels forward and turns to the right side in the traveling direction according to the road shape illustrated in FIG. 7.

FIG. 8(a) illustrates a posture of conventional vehicle 1. As illustrated in FIG. 5, in the conventional vehicle 1, the roll angle 51(a) occurs in the turning outer direction.

FIG. 8(b) illustrates a posture of the vehicle 1 in which the present invention is used. As illustrated in FIG. 6, the roll angle 51(b) occurs in the turning inner direction in the vehicle 1 using the present invention. However, the roll angle 51(b) is the target value 2 generated by the target value 2 generation unit 22 and is the target value 2 not corrected by the final target generation unit 24.

FIG. 8(c) illustrates the posture of the vehicle 1 in which the present invention is used and the corrected target value 2 is used.

The roll angle 51(c) that actually occurs is generated as a roll angle 51(c) that has an upper limit in the moment in the roll direction that realizes the change of the roll angle 51(b) and swings to the outer side of the turning with respect to the roll angle 51(b) depending on the operation range of the actuator that realizes the change of the roll angle 51(b), for example, the torque upper limit of the motor 12 and the thrust upper limit of the suspension 15.

The limit generation unit 23 generates the limit value of the target value 2 generated by the target value 2 generation unit 22 based on the operation range of the actuator, and the final target generation unit 24 generates the target value 2 by correcting the target value 2 based on the actuator limit (the limit value of the target value 2) generated by the limit generation unit 23.

Note that the larger the moment in the roll direction, the larger the roll angle 51 changes to the turning inner side with reference to the roll angle 51(a). As a result, the upper limit of the roll angle 51 also appears as the upper limit of the change width from the roll angle 51(*a*).

Next, a time waveform of the roll angle based on the actuator limit of the vehicle 1 will be described.

Figure 9:
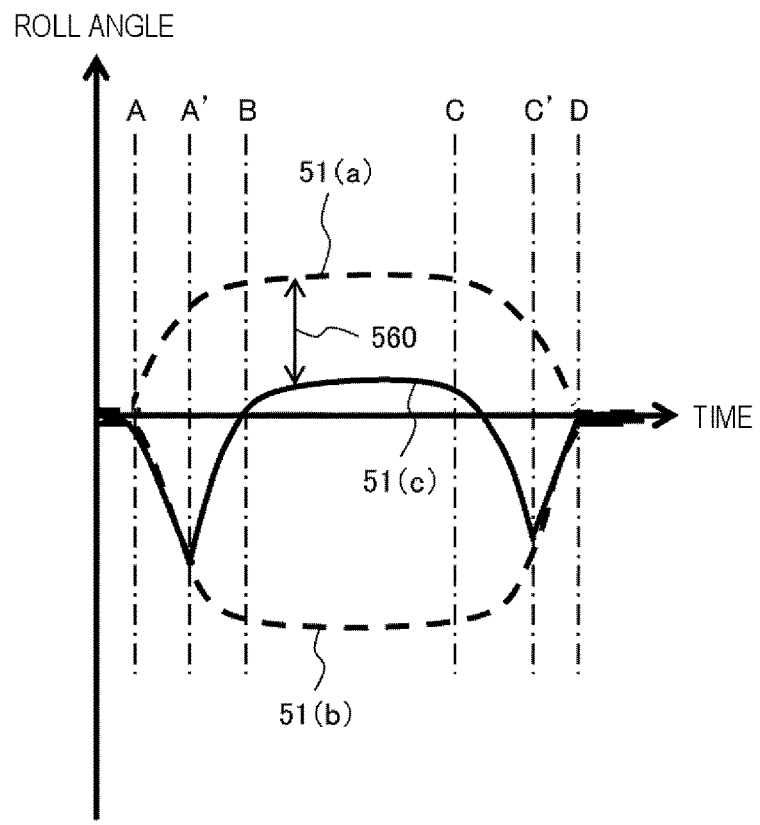
FIG. 9 is an explanatory diagram for illustrating a time waveform of a roll angle based on the actuator limit of the vehicle 1.

FIG. 9 is an explanatory diagram for illustrating the time waveform of the roll angle based on the actuator limit of the vehicle 1, and illustrates the actuator limit generated by the limit generation unit 23 at the roll angle 51. That is, FIG. 9 illustrates a time waveform (temporal change) in a case where the upper limit of the roll angle 51 appears as the upper limit of the change width from the roll angle 51(*a*).

FIG. 9 illustrates a time waveform of a change in the roll angle 51 that occurs in a case where the vehicle 1 travels on the road shape illustrated in FIG. 7, where the horizontal axis is time and the vertical axis is the roll angle.

In FIG. 9, the definitions of the roll angle 51(*a*), the roll angle 51(*b*), and the roll angle 51(*c*) illustrated in the time waveform of the roll angle 51 are the same as those in FIG. 8. Further, in FIG. 9, similar delimiters (A, B, C, and D) are used at times corresponding to the five sections of the road shape illustrated in FIG. 7.

First, in (A) that is about to go from the first section to the second section, the curvature gradually increases, so that the roll angle 51 occurs. At this time, the roll angle 51(*a*) increases in the positive direction, that is, the turning outer direction.

Then, the target value 2 generation unit 22 generates the target value 2 to roll in the negative direction, that is, the turning inner direction, as illustrated in the roll angle 51(*b*). As long as the actuator limit is not reached, the final target value (the roll angle 51(*c*) that actually occurs) obtained by correcting the target value 2 by the final target generation unit 24 based on the limit value of the target value 2 generated by the limit generation unit 23 matches the roll angle 51(*b*).

That is, in a case where the actuator is within the operation range, the limit generation unit 23 generates the target value 2 generated based on the target value 1 as the limit value of the target value 2.

However, as the deviation 560 (actuator limit) between the roll angle 51(*a*) and the roll angle 51(*b*) increases, the moment in the roll direction necessary for realizing the roll angle of the roll angle 51(*b*) increases, and as a result, the moment in the roll direction is saturated (reaches the actuator limit) at a certain time point (A') in the second section.

That is, in a case where the actuator is not in the operation range (other than), the limit generation unit 23 generates the limit value of the target value 2 generated based on the target value 1, and the final target generation unit 24 corrects the target value 2 based on the limit value of the target value 2 and generates the final target value in which the target value 2 is corrected.

In addition, the limit generation unit 23 generates (calculates) an upper limit of a change width with respect to the target value 2 based on the operation range of the actuator, and generates (calculates) a limit value of the target value 2 based on the upper limit of the change width.

Thereafter, the roll angle 51 cannot occur as per the roll angle 51(*b*), and the roll angle 51(*c*) that actually occurs has a waveform in which the deviation 560 from the roll angle 51(*a*) is constant.

In addition, depending on the magnitude of the deviation 560, as illustrated in FIG. 9, the roll angle 51(*c*) that actually occurs may become the turning outer side (positive direction) in the third section (B to C).

Thereafter, the curvature decreases and the roll angle 51(*a*) decreases from (C) reaching the third section to the fourth section, the roll angle 51(*c*) that actually occurs approaches the roll angle 51(*b*) of the target value 2, the moment in the roll direction is not saturated (the actuator limit is released) at a certain time point (C') in the fourth section, and the roll angle 51(*b*) and the roll angle 51(*c*) match again.

As described above, since the MSI cannot be generated according to the target value 2 (roll angle 51(*b*)) that minimizes the MSI under the actuator limit, it is noted how the MSI changes depending on the roll angle 51(*c*) (roll angle 51(*c*) that actually occurs) that occurs as a result under the actuator limit.

Next, a time waveform of the roll angle based on the actuator limit of the vehicle 1 will be described.

Figure 10A:
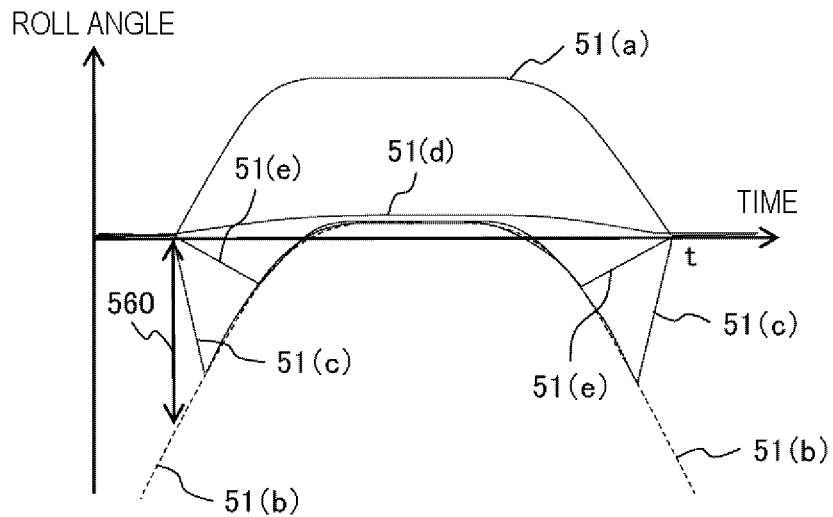
FIG. 10A is an image diagram for illustrating the time waveform of the roll angle based on the actuator limit of the vehicle 1.

FIG. 10A is an image diagram for illustrating a time waveform of a roll angle based on an actuator limit of the vehicle 1, and is a time waveform (temporal change) of the roll angle in a case where the amplitude of the roll angle 51 is variously changed under the same road shape and actuator limit as in FIG. 9.

In FIG. 10A, as in FIG. 9, the roll angle 51(*a*) occurs in the turning outer direction in the normal vehicle 1 not using the present invention. On the other hand, the target value 2 (roll angle 51(*b*)) is generated to reduce MSI, but actually, a waveform such as the roll angle 51(*c*) is obtained due to actuator limit.

Therefore, the roll angle 51(*d*) that hardly touches the actuator limit is generated as the actual roll angle 51. In addition, as an intermediate portion between the roll angle 51(*c*) and the roll angle 51(*d*), although the actuator limit is touched, a roll angle 51 such as a roll angle 51(*e*) that suppresses a rapid change in the movement direction of the roll angle 51 occurs.

Next, the relationship between the roll angle amplitude based on the actuator limit of the vehicle 1 and the MSI after passing through the curve will be described.

Figure 10B:
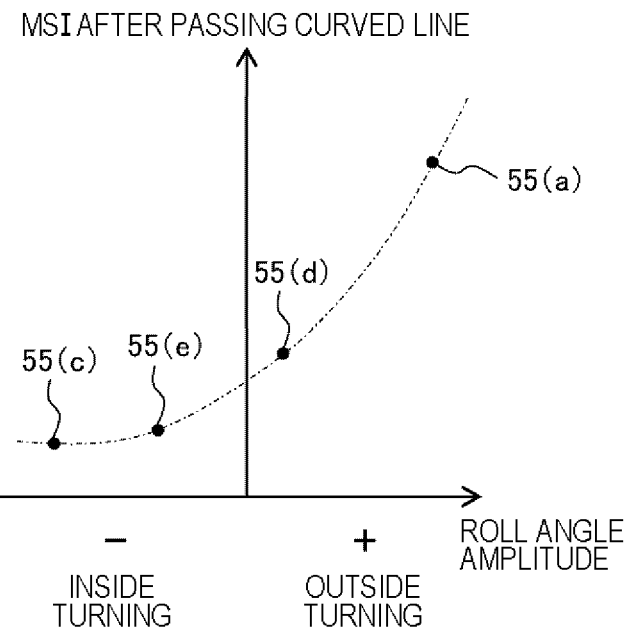
FIG. 10B is an explanatory diagram for illustrating a relationship between a roll angle amplitude based on the actuator limit of the vehicle 1 and MSI after passing through the curve.

FIG. 10B is an explanatory diagram for illustrating the relationship between the roll angle amplitude based on the actuator limit of the vehicle 1 and the MSI after passing through the curve, and illustrates the tendency of the MSI 55 after passing through the curve for each of the roll angle 51(*a*), the roll angle 51(*c*), the roll angle 51(*d*), and the roll angle 51(*e*). Here, the horizontal axis represents the roll angle amplitude, and the vertical axis represents the MSI 55 after passing through the curve.

The roll angle amplitude represents a peak value of the roll angle (a value in the third section of FIG. 7) in a case where it is assumed that there is no actuator limit.

In FIG. 10B, the peak value of the roll angle 51(*a*) is large in the positive direction, and the peak value of the roll angle 51(*c*) is large in the negative direction. Similarly, the roll angle 51(*d*) is a small value in the positive direction, and the roll angle 51(*e*) is a small value in the negative direction.

The MSI 55 after passing through the curve at this time decreases as the amplitude (peak value) of the roll angle 51 is in the turning inner direction. That is, the MSI 55 after passing through the curve is MSI 55(*a*)>MSI 55(*d*)>MSI 55(*e*)>MSI 55(*c*).

That is, for the purpose of reducing only the MSI 55, simply, the target value 2 is generated based on the minimum roll angle (Expression 1) of the MSI in a case where there is no actuator limit, and control is always performed such that the roll angle is directed to the turning inner side most under the actuator limit.

On the other hand, in the waveform such as the roll angle 51(*c*), that is, in the MSI 55(*c*), the movement direction of the roll angle 51 rapidly changes as illustrated at the time (A') of FIG. 9, and this change may impair the ride comfort for the occupant.

Next, a time waveform of the roll rate based on the actuator limit of the vehicle 1 will be described.

Figure 11:
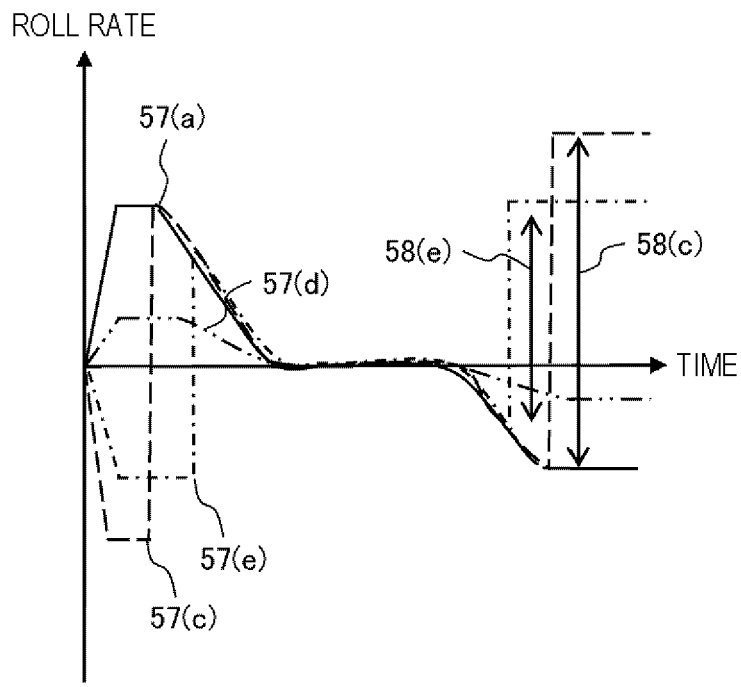
FIG. 11 is an explanatory diagram for illustrating a time waveform of a roll rate based on the actuator limit of the vehicle 1.

FIG. 11 is an explanatory diagram for illustrating a time waveform of the roll rate based on the actuator limit of the vehicle 1, and illustrates a waveform of the roll rate which is a temporal change of each of the roll angle 51(*a*), the roll angle 51(*c*), the roll angle 51(*d*), and the roll angle 51(*e*).

The roll rate 57(*a*) (solid line) is an image of the time differential value of the roll angle 51(*a*), the roll rate 57(*c*) (dotted line) is an image of the time differential value of the roll angle 51(*c*), the roll rate 57(*c*) (dotted line) is an image of the time differential value of the roll angle 51(*c*), the roll rate 57(*d*) (dashed double-dashed line) is an image of the time differential value of the roll angle 51(*d*), and the roll rate 57(*e*) (dotted chain line) is an image of the time differential value of the roll angle 51(*e*).

Among these, in the roll rate 57(*a*) and the roll rate 57(*d*) that do not touch the actuator limit, a rapid change in the roll rate does not occur, the roll rate is positive in the second section, the roll rate is constant at 0 in the third section, and the roll rate is negative in the fourth section.

Since the amplitude of the roll angle is roll angle 51(*a*) >roll angle 51(*d*), the magnitude (absolute value) of the roll rate is also, as a whole, roll rate 57(*a*)>roll rate 57(*d*).

On the other hand, as illustrated in FIG. 10, the roll rate 57(*c*) and the roll rate 57(*e*) have waveforms that touch the actuator limit, and both have waveforms that are the same as the roll rate 57(*a*) and the roll rate 57(*d*) until the middle of the third section and the fourth section after the roll rate swings negatively in the second section and then suddenly changes discontinuously in the positive direction at a certain point of time. Thereafter, the roll rate 57 has a waveform that rapidly changes to the opposite side in the middle of the fourth section.

That is, as illustrated in FIG. 11, in the waveforms of the roll rate 57(*c*) and the roll rate 57(*e*), a change width 58(*c*) of the roll rate 57(*c*) and a change width 58(*e*) of the roll rate 57(*e*) are generated. In addition, the change width is change width 58(*c*)>change width 58(*e*).

As described above, the magnitude of the change width is the magnitude of a rapid change in the movement direction of the roll angle 51, which causes deterioration in ride comfort.

That is, in order to achieve both MSI reduction and ride comfort improvement, it is not always necessary to perform control such that the roll angle 51 is directed to the turning inner side the most under the actuator limit, and it is necessary to pay attention so that the change width 58 of the roll rate 57 does not increase.

Next, referring to FIG. 12A, one method in which the final target generation unit 24 generates a final target value 59 will be described.

Figure 12A:
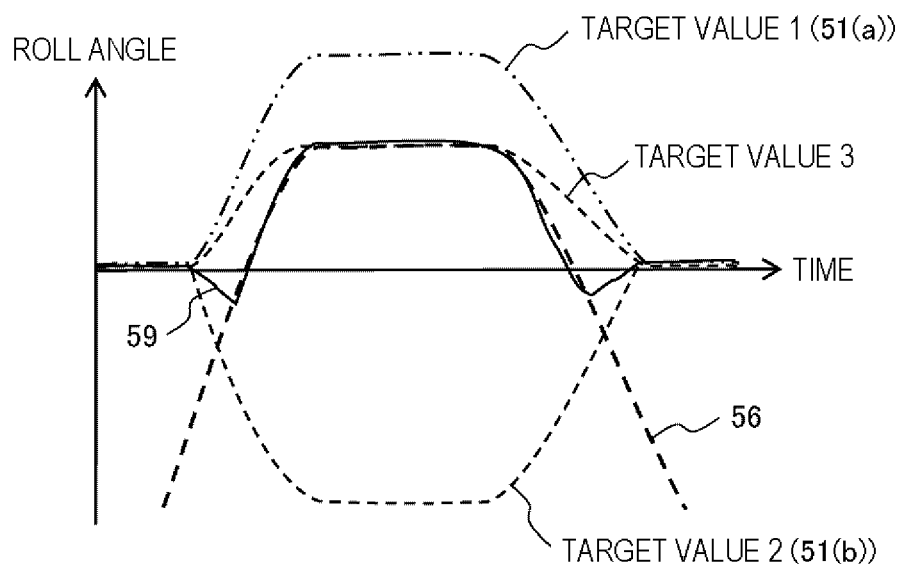
FIG. 12A is an explanatory diagram for illustrating a time waveform of roll angle control by the vehicle integrated control device 2 described in Example 1.

FIG. 12A is an explanatory diagram for illustrating a time waveform of roll angle control by the vehicle integrated control device 2 described in Example 1, and is a time waveform with respect to a change in the roll angle when the vehicle travels on the road shape illustrated in FIG. 7, similarly to FIGS. 9 and 10.

In FIG. 12A, as in FIGS. 9 and 10, the roll angle 51(*a*) (target value 1) occurs in the turning outer direction in the normal vehicle 1. On the other hand, in the target value 2 generation unit 22, the target value 2 (roll angle 51(*b*)) is generated to instruct the roll angle in the turning direction to reduce the MSI. At the same time, the limit generation unit 23 generates an actuator limit (a limit value of the target value 2).

As illustrated in FIGS. 9 and 10, the actuator limit 56 in this case indicates the lower limit of the roll angle that can be output by the actuator on the assumption that the change width from the roll angle 51(*a*) has an upper limit.

Then, the final target generation unit 24 generates the target value 3 (the target value 2 is divided by a constant based on the limit value of the target value 2, and the target value 3 is a target motion limit amount generated within the operation range of the actuator) that minimizes the MSI within a range not touching the actuator limit (an operation range of the actuator that can be realized under the actuator limit). Furthermore, the final target value 59 is generated between the target value 2 and the target value 3. However, the final target value 59 may match the target value 2 or the target value 3.

Next, referring to FIG. 12B, one method in which the final target generation unit 24 generates the final target value 59 will be described.

FIG. 12B is an explanatory diagram for illustrating a time waveform of roll rate control by the vehicle integrated control device 2 described in Example 1, and illustrates a temporal change (roll rate) of the final target value 59 illustrated in FIG. 12A.

In FIG. 12B, the change width 58 of the roll rate 57 is generated to be within a predetermined value.

When the roll angle of the target value 2 is θ2 and the roll angle of the target value 3 is θ3, the roll angle ° F. of the final target value 59 is expressed by Expression 2.

$$\theta F = W * \theta 2 + (1 - W) * \theta 3 \qquad [\text{Math. 2}]$$

Here, W is a constant of 0 or more and 1 or less, and indicates a weight. The closer W is to 1, the closer it is to the target value 2, and the closer W is to 0, the closer it is to the target value 3.

In addition, as the change width 58 of the roll rate 57 is decreased, W approaches 0, and as the change width 58 of the roll rate 57 is increased, W approaches 1.

As a result, while utilizing the characteristics of the target value 2 and the target value 3 generated from the viewpoint of minimizing the MSI, the final target value 59 is generated by effectively correcting the target value 2 so that the change width 58 of the roll rate 57 falls within a predetermined value, and both the MSI reduction and ride comfort improvement are realized.

As described above, the vehicle integrated control device 2 described in Example 1 includes the target value 3 generation unit (third target value generation unit) that divides the constant by the target value 2 based on the limit value of the target value 2 and generates the target value 3 (third motion parameter) that is the target motion limit amount within the operation range of the actuator.

Then, the final target generation unit 24 generates the final target value 59 by a weighted sum based on the target value 2 and the target value 3.

Note that the method of generating the final target value 59 is not limited to this, and can be appropriately set between the target value 2 and the target value 3.

Next, a time waveform of the operation amount assignment by the vehicle integrated control device 2 described in Example 1 will be described.

Figure 13:
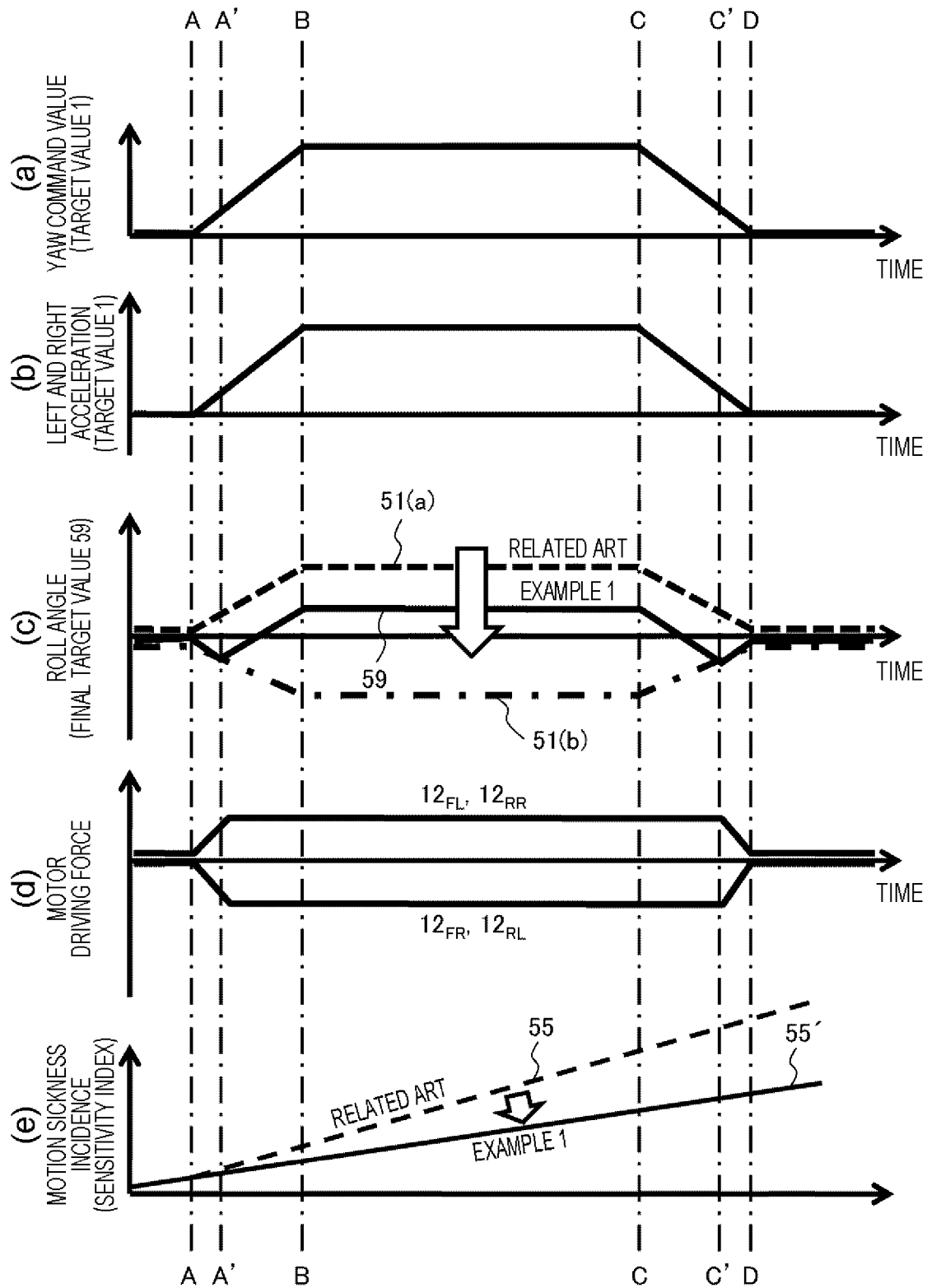
FIG. 13 is an explanatory diagram for illustrating a time waveform of operation amount assignment by the vehicle integrated control device 2 described in Example 1.

FIG. 13 is an explanatory diagram for illustrating a time waveform of operation amount assignment by the vehicle integrated control device 2 described in Example 1.

The operation of the operation amount assignment unit 25 based on the final target value 59 will be described with reference to FIG. 13 based on the traveling on the left curve illustrated in FIG. 7.

FIG. 13(a) illustrates a target value 1 "yaw command value" necessary for steering control output from the external control device 3 to the vehicle integrated control device 2 when the vehicle 1 travels on the left curve illustrated in FIG. 7.

As illustrated herein, the yaw command value required in the first section (to A) and the fifth section (D to) of the curvature 0 is 0. In addition, the yaw command value required in the second section (A to B) where the curvature gradually increases monotonically increases, and the yaw command value required in the fourth section (C to D) where the curvature gradually decreases monotonically decreases. The yaw command value required in the third section (B to C) where the curvature is constant is constant.

FIG. 13(b) illustrates the left and right acceleration actually generated in a case where the vehicle 1 travels according to the yaw command value in FIG. 13(a). In a case where the yaw command value in FIG. 13(a) is input in advance from the external control device 3, the target value 1 generation unit 21 calculates the left and right acceleration in FIG. 13(b) as the target value 1 prior to actual traveling.

The dotted line in FIG. 13(c) indicates the roll angle 51(a) of the vehicle 1 predicted to be generated by the left and right acceleration in FIG. 13(b) in a case where the control of Example 1 is not used (related art).

In the vehicle 1 of FIG. 7, the roll angle 51 in the case of inclining rightward is defined as positive, and the roll angle 51 in the case of inclining leftward is defined as negative. Therefore, in the vehicle 1 traveling on the left curve of FIG. 7, a roll inclining rightward occurs in a case where the control of Example 1 is not used. In this case, according to the MSI calculation method illustrated in FIG. 4, a large MSI 55 as indicated by a dotted line in FIG. 13(e) is calculated, and the MSI increases.

On the other hand, a solid line in FIG. 13(c) indicates a case where the control of Example 1 is used, and is the roll angle 51 generated as the final target value 59 by the final target generation unit 24.

The target value 2 generation unit 22 generates the roll angle 51(b) based on a control command (target value 2) for inclining the vehicle 1 traveling on the left curve illustrated in FIG. 7 to the left. However, there is a limit to the operation amount of the actuator that changes the roll angle.

Therefore, when the turning is started at the point A illustrated in FIG. 7, the roll angle 51 is displaced in the direction of inclining to the left, but thereafter, from the point A' where a little time has elapsed, the target value 2 is corrected based on the actuator limit (larger than the limit of the operation amount of the actuator), the roll angle 51 is displaced in the direction of inclining the vehicle 1 to the right, and thereafter, the roll angle 51 is in the direction of inclining to the right up to the point B.

This state continues up to the point C, and the roll angle 51 is displaced in the direction of inclining the vehicle 1 to the left from the point C, but thereafter, from the point C' where a little time has elapsed, the value becomes equal to or less than the limit of the operation amount of the actuator, the target value 2 is not corrected, the roll angle 51 becomes the target value 2, and reaches the point D as it is.

As described above, in Example 1, the occurrence of the roll angle 51 in the positive direction is suppressed as compared with the related art. Therefore, in this case, according to the MSI calculation method illustrated in FIG. 4, a relatively small MSI 55' as indicated by the solid line in FIG. 13(e) is calculated, and the MSI is reduced.

FIG. 13(d) illustrates the motor driving force generated by each motor 12 by the operation amount assignment unit 25 in order to realize the roll angle 51 indicated by the solid line in FIG. 13(c). That is, from the second section to the fourth section, the motor driving force in the positive direction is generated in the left front and right rear motors $12_{FL}$ and $12_{RR}$, and the motor driving force in the negative direction is generated in the right front and left rear motors $12_{FR}$ and $12_{RL}$. As indicated by the solid line in FIG. 13(e), relatively small MSI 55' is calculated, and the MSI is reduced.

Next, posture control of the vehicle 1 by motor driving force by the vehicle integrated control device 2 described in Example 1 will be described.

Figure 14:
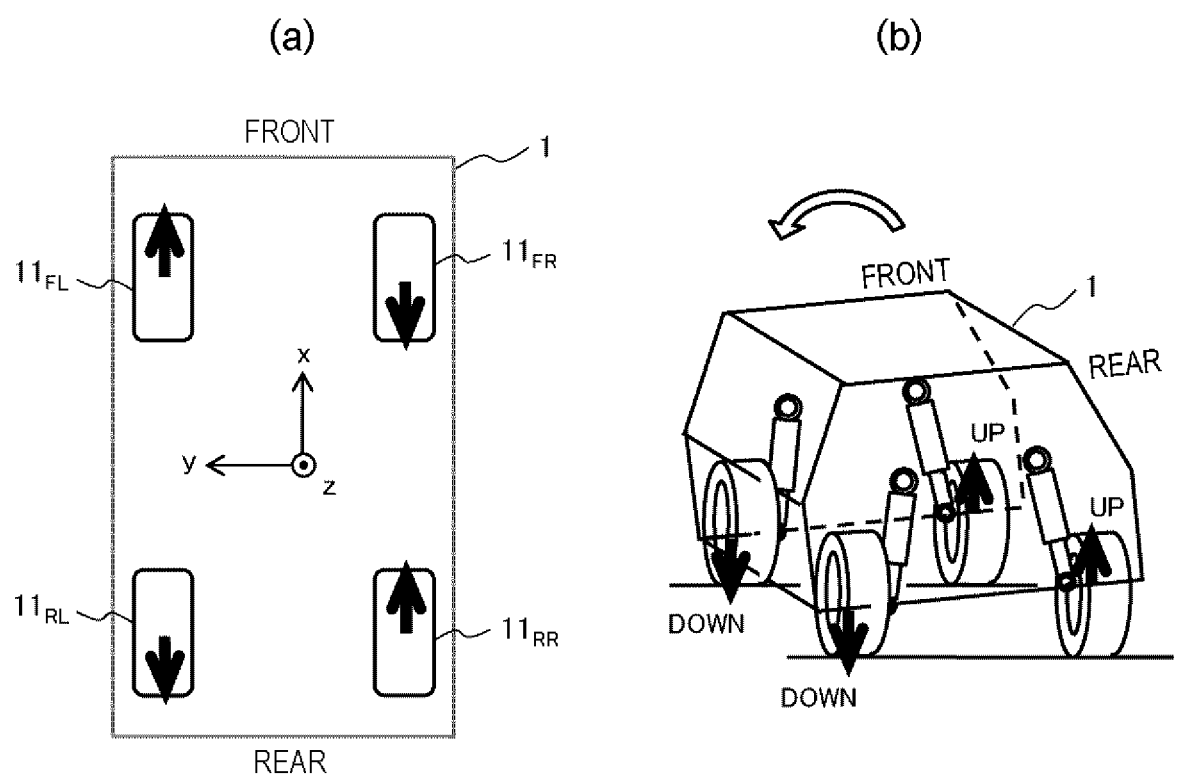
FIG. 14 is an explanatory diagram for illustrating posture control of the vehicle 1 by motor driving force by the vehicle integrated control device 2 described in Example 1.

FIG. 14 is an explanatory diagram for illustrating the posture control of the vehicle 1 by motor driving force by the vehicle integrated control device 2 described in Example 1.

In the motor driving force illustrated in FIG. 13(d), as illustrated in FIG. 14(a), positive driving force is generated in the left front wheel $11_{FL}$ and the right rear wheel $11_{RR}$, and a negative driving force is generated in the right front wheel $11_{FR}$ and the left rear wheel $11_{RL}$.

As a result, in the vehicle 1, a suspension force in the DOWN direction is generated on the left side and a suspension force in the UP direction is generated on the right side as illustrated in the right part (b) of FIG. 14. By that suspension force, the vehicle 1 is inclined to the left, and posture control of the vehicle 1 along the final target value 59 of FIG. 13(c) generated as an internal command is realized.

However, after reaching the second section at the point A, the motor driving force reaches the upper limit at the point A', and the motor driving force does not increase any more. This causes the roll angle 51 to switch the direction of inclining the vehicle 1 rightward in FIG. 13(c). The state of reaching the upper limit continues from the point A' to the point C' beyond the point C. From the point C', the state of reaching the upper limit is released, and the operation is within the limit.

Here, the posture control of the vehicle 1 is realized by the suspension force caused by the driving force of the motor 12, but the posture control of the vehicle 1 may be realized by a change in the active force of the suspension 15.

Next, a behavior change in the roll angle due to the road shape will be described.

Figure 15:
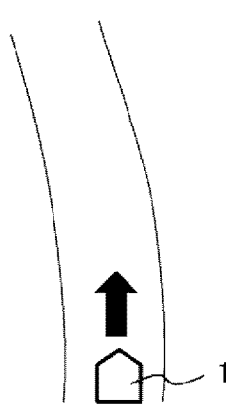
FIG. 15 is an explanatory diagram for illustrating a behavior change in a roll angle due to a road shape having a small curvature.
Figure 15:
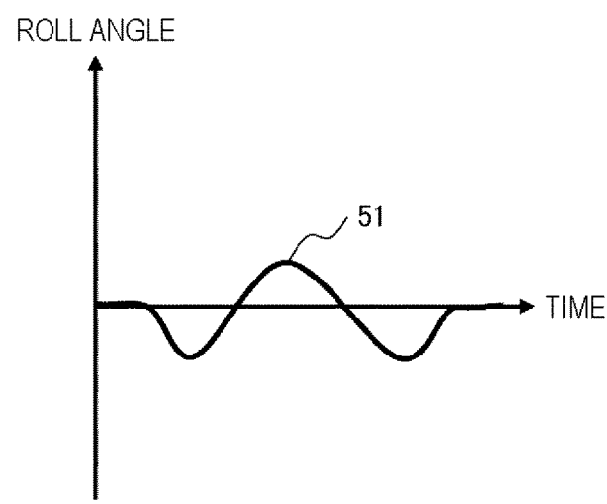
Figure 15:
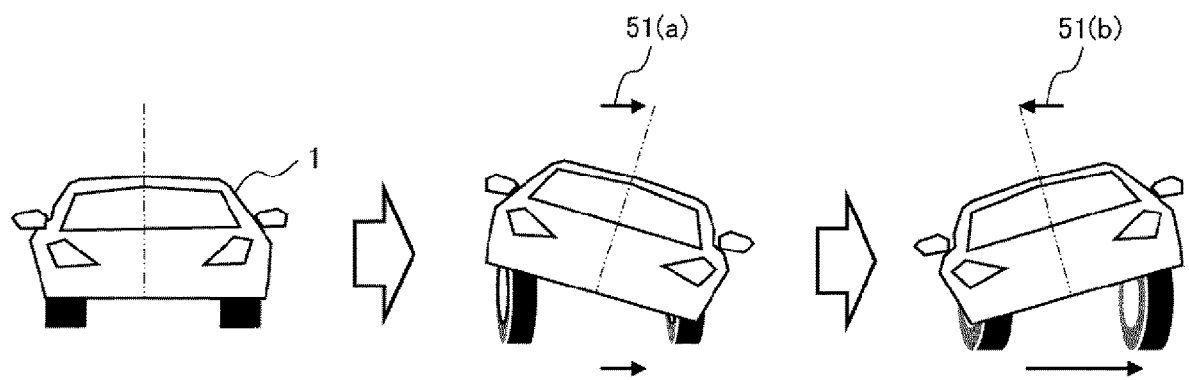

FIG. 15 is an explanatory diagram for illustrating the behavior change in the roll angle due to the road shape having a small curvature.

Figure 16:
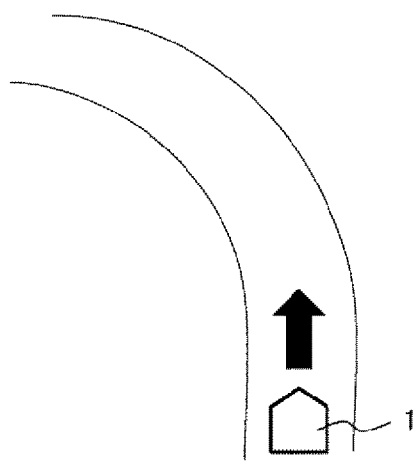
FIG. 16 is an explanatory diagram for illustrating a behavior change in a roll angle due to a road shape having a large curvature.
Figure 16:
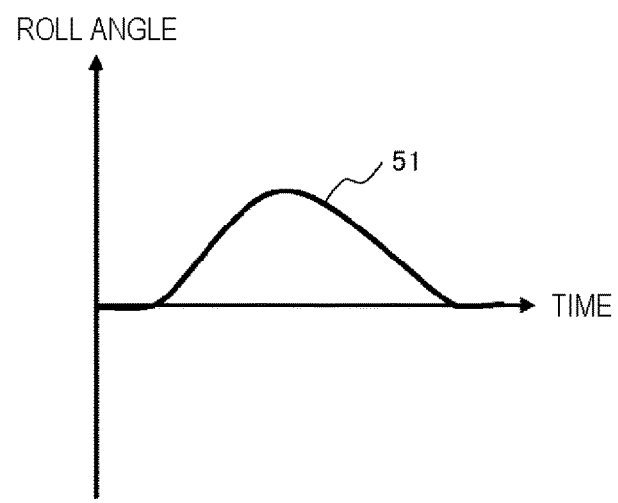
Figure 16:
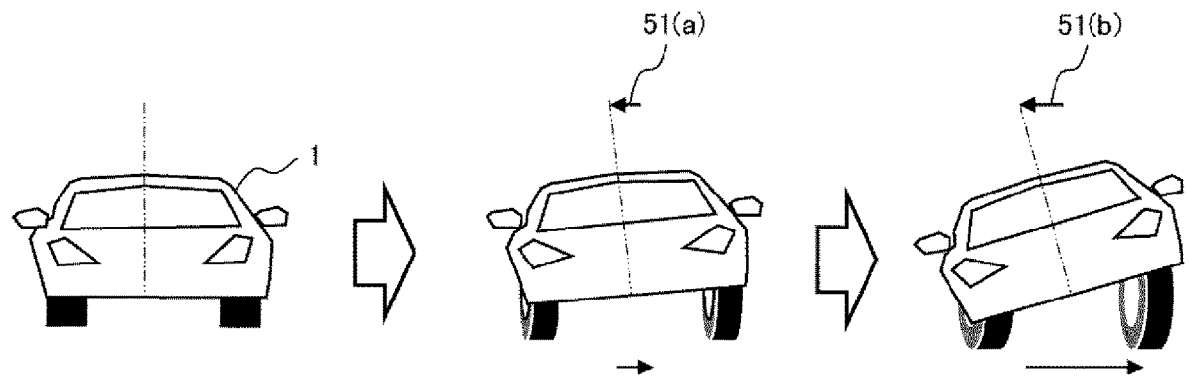

FIG. 16 is an explanatory diagram for illustrating the behavior change in the roll angle due to the road shape having a large curvature.

The behavior change of Example 1 due to the difference in the road shape or the traveling method will be described using FIGS. 15 and 16.

In Example 1, the target value 2 is corrected so that the change width 58 of the roll rate 57 is within a predetermined value to generate the final target value 59. The change width 58 of the roll rate 57 changes depending on the road shape or the traveling method.

As for the road shape, as the curvature is larger or the distance of the transition curve is shorter, the possibility that the target value 2 touches the actuator limit 56 becomes higher, and the change width 58 of the roll rate 57 becomes larger.

In addition, even in the same road shape, as the passing speed of the vehicle 1 increases, that is, as the acceleration in the lateral direction or the jerk increases, the possibility that the target value 2 touches the actuator limit 56 increases, and the change width 58 of the roll rate 57 increases.

Therefore, the characteristics of the waveform of the final target value 59 change due to the difference in these conditions.

The upper left part (a) of FIG. 15 illustrates a case where the curvature is small as the road shape. In this case, in a case where the target value 2 touches the actuator limit 56, there is a high possibility that the target value 2 touches the actuator limit 56 after a lapse of a while after the vehicle 1 starts turning, and the change width 58 of the roll rate 57 becomes small.

Therefore, as illustrated in FIG. 12A, the final target value 59 approaches the target value 2, and has a plurality of extreme values such as a positive swing and a negative swing after the roll angle 51 swings negatively as in the time waveform illustrated in the upper right part (b) of FIG. 15.

As the movement of the vehicle 1, as illustrated in the lower part (c) of FIG. 15, the roll angle 51(a) is generated in the turning inner direction and then the roll angle 51(b) is generated in the turning outer direction.

On the other hand, the upper left part (a) of FIG. 16 illustrates a case where the curvature is large as the road shape. In this case, in a case where the target value 2 touches the actuator limit 56, there is a high possibility that the target value 2 touches the actuator limit 56 immediately after the vehicle 1 starts turning, and the change width 58 of the roll rate 57 becomes large.

Therefore, as illustrated in FIG. 12A, the final target value 59 approaches the target value 3, and as in the time waveform illustrated in the upper right part (b) of FIG. 16, the roll angle 51 has a single extreme value such as swinging only positively.

As one movement of the vehicle, as illustrated in the lower part (c) of FIG. 16, the roll angle 51(a) is generated in the turning outer direction from the beginning, and the roll angle 51(b) increases in the turning outer direction as it is.

That is, in Example 1, the final target generation unit 24 corrects the temporal change in the target value 2 based on the vehicle speed, the acceleration, and the jerk of the vehicle 1, or the curvature of the road shape determined based on the target value 1, or a plurality of these parameters.

In addition, in Example 1, the final target generation unit 24 corrects the temporal change in the target value 2 such that the larger or smaller the vehicle speed, the acceleration, and the jerk of the vehicle 1, or the curvature of the road shape determined based on the target value 1, a plurality of these parameters, the fewer or greater the number of points that take an extreme value.

Although the control of the roll angle 51 has been described in Example 1, the vehicle integrated control device 2 controls the vehicle movement in six degrees of freedom, and is not limited to the control of the roll angle 51.

For example, it can also be used to control the pitch angle. In this case, the relationship between the front and rear acceleration of the vehicle 1 and the pitch angle can be similarly described. That is, the target value 2 generation unit 22 controls the pitch angle so that the combined acceleration of the inertia acceleration and the gravity acceleration generated in the front and rear direction becomes the vertically downward direction with respect to the vehicle 1 and the deviation between the combined acceleration and the gravity acceleration expected by the occupant becomes small, whereby the MSI is minimized.

In the case of the normal vehicle 1, when acceleration in the front direction (positive direction) is generated with respect to the vehicle 1, inertia acceleration is generated in the rear direction of the vehicle 1, and the vehicle 1 is pitched in the rear direction (negative direction). On the other hand, the MSI decreases with increasing pitch in the front direction (positive direction) with respect to the vehicle 1.

The actuator limit can be considered as an upper limit of a change width of the pitch angle with respect to the pitch angle generated in the normal vehicle 1. As described above, the roll angle 51 and the pitch angle are the same except that the roll angle and the pitch angle are different in positive and negative.

As described above, according to the vehicle integrated control device 2 described in Example 1, it is possible to achieve both the MSI reduction and the ride comfort improvement under actuator limit.

Note that the present invention is not limited to the above-described embodiments, and includes various modifications. For example, the above-described embodiments have been specifically described in order to describe the present invention in an easy-to-understand manner, and are not necessarily limited to those having all the described configurations.

Further, a part of the configuration of one example can be replaced with a part of the configuration of another example. In addition, the configuration of another example can be added to the configuration of a certain example. In addition, a part of the configuration of each example can be deleted, and a part of another configuration can be added and replaced with a part of another configuration.

REFERENCE SIGNS LIST 1 vehicle
11 wheel
12 motor
13 brake mechanism
13a wheel cylinder
13b braking control device
14 steering mechanism
14a steering control device
14b steering motor
15 suspension
16 accelerator pedal
16a stroke sensor
16b acceleration control device
17 brake pedal
18 steering wheel
18a steering torque detection device
18b steering angle detection device
2 vehicle integrated control device
21 target value 1 generation unit
22 target value 2 generation unit
23 limit generation unit
24 final target generation unit
25 operation amount assignment unit
3 external control device
4 combiner sensor
51 roll angle
52 gravity acceleration
53 inertia acceleration 54 combined acceleration
55 MSI
56 actuator limit
57 roll rate
58 change width of roll rate
59 final target value
550 deviation
560 deviation

The invention claimed is:

1. A vehicle integrated control device that controls a motion parameter of a vehicle in which a plurality of actuators are installed, which are configured by a direction of movement on up to three control axes and the direction of rotation around the control axes, the device comprising:
a first target value generation unit that acquires a target momentum of a control axis related to a driving task of the vehicle and generates a first motion parameter that is at least one motion parameter;
a second target value generation unit that generates a second motion parameter different from the first motion parameter based on the first motion parameter to optimize a sensitivity index;
a limit generation unit that generates a motion limit amount of the second motion parameter based on the first motion parameter and an operation range of an actuator;
a final target generation unit that corrects the second motion parameter based on the motion limit amount; and
an operation amount assignment unit that generates an operation amount of an actuator based on the first motion parameter and the second motion parameter corrected by the final target generation unit.

2. The vehicle integrated control device according to claim 1, wherein the second target value generation unit generates the second motion parameter to minimize on motion sickness incidence.

3. The vehicle integrated control device according to claim 1, wherein the second target value generation unit generates a roll angle such that a combined acceleration of an inertia acceleration and a gravity acceleration generated in a left and right direction is in a vertically downward direction and a deviation between the combined acceleration and a gravity acceleration expected by an occupant is reduced.

4. The vehicle integrated control device according to claim 1, wherein the second target value generation unit generates a pitch angle such that a combined acceleration of an inertia acceleration and a gravity acceleration generated in a front and rear direction is in a vertically downward direction and a deviation between the combined acceleration and a gravity acceleration expected by an occupant is reduced.

5. The vehicle integrated control device according to claim 1, wherein the final target generation unit corrects the second motion parameter based on a vehicle speed, an acceleration, or a jerk of the vehicle, or a curvature of a road shape determined based on the first motion parameter, or a plurality of these parameters.

6. The vehicle integrated control device according to claim 1, wherein the final target generation unit corrects the second motion parameter such that the larger or smaller the vehicle speed, the acceleration, or the jerk of the vehicle, or the curvature of the road shape determined based on the first motion parameter, or a plurality of these parameters, the fewer or greater a number of points that take an extreme value.

7. The vehicle integrated control device according to claim 1, wherein the limit generation unit generates the second motion parameter generated based on the first motion parameter as the motion limit amount of the second motion parameter in a case where the actuator is in the operation range.

8. The vehicle integrated control device according to claim 7, wherein the limit generation unit generates the motion limit amount of the second motion parameter generated based on the first motion parameter in a case where the actuator is not in the operation range.

9. The vehicle integrated control device according to claim 1, wherein the limit generation unit generates an upper limit of a change width with respect to the second motion parameter based on an operation range of the actuator, and generates a motion limit amount of the second motion parameter based on the upper limit of the change width.

10. The vehicle integrated control device according to claim 1, wherein the motion limit amount of the second motion parameter generates an upper limit or a lower limit of the roll angle or the pitch angle.

11. The vehicle integrated control device according to claim 1, further comprising a third target value generation unit that divides the second motion parameter by a constant and generates a third motion parameter that is a target motion limit amount to be an operation range of the actuator.

12. The vehicle integrated control device according to claim 11, wherein the final target generation unit generates a final target value by a weighted sum of the second motion parameter and the third motion parameter.

13. A vehicle integrated control method of controlling a motion parameter of a vehicle in which a plurality of actuators are installed, which are configured by a direction of movement on up to three control axes and the direction of rotation around the control axes, the method comprising:
acquiring a target momentum of a control axis related to a driving task of the vehicle and generating a first motion parameter that is at least one motion parameter by a first target value generation unit;
generating a second motion parameter different from the first motion parameter based on the first motion parameter to optimize a sensitivity index by a second target value generation unit;
generating a motion limit amount of the second motion parameter based on the first motion parameter and an operation range of an actuator by a limit generation unit;
correcting the second motion parameter based on the motion limit amount by a final target generation unit; and
generating an operation amount of an actuator based on the first motion parameter and the second motion parameter corrected by the final target generation unit by an operation amount assignment unit.

* * * * *